US012806755B2

(12) United States Patent
Obermann et al.

(10) Patent No.: US 12,806,755 B2
(45) Date of Patent: Nov. 24, 2026

(54) OUT-OF-BAND POINT OF SALE ACTIVATION FOR ELECTRONIC POWER TOOL DEVICES

(71) Applicant: MILWAUKEE ELECTRIC TOOL CORPORATION, Brookfield, WI (US)

(72) Inventors: Timothy R. Obermann, Waukesha, WI (US); Anthony M. Davis, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/419,647

(22) Filed: Dec. 15, 2025

(65) Prior Publication Data

US 2026/0102891 A1 Apr. 16, 2026

Related U.S. Application Data

(63) Continuation of application No. 18/778,150, filed on Jul. 19, 2024, now Pat. No. 12,496,700, which is a (Continued)

(51) Int. Cl.
*B25F 5/00* (2006.01)
*E05B 73/00* (2006.01)
(Continued)

(52) U.S. Cl.
CPC ............ *B25F 5/00* (2013.01); *E05B 73/0017* (2013.01); *G06F 9/4418* (2013.01); *G06F 21/44* (2013.01); *H04L 9/0877* (2013.01); *G06F 9/547* (2013.01)

(58) Field of Classification Search
CPC ........ B25F 5/00; E05B 73/0017; G06F 9/547; G06F 9/4418; G06F 21/44; H04L 9/0877
See application file for complete search history.

(56) References Cited

U.S. PATENT DOCUMENTS

| | | | |
|---|---|---|---|
| 1,713,583 | A | 5/1929 | Winkley et al. |
| 2,455,876 | A | 12/1948 | Potter et al. |

(Continued)

FOREIGN PATENT DOCUMENTS

| | | | |
|---|---|---|---|
| CN | 102035564 | A | 4/2011 |
| CN | 107921618 | A | 4/2018 |

(Continued)

OTHER PUBLICATIONS

International Search Report and Written Opinion for Application No. PCT/US2020/065868 dated Apr. 19, 2021 (9 pages).

(Continued)

*Primary Examiner* — Eyamindae C Jallow
(74) *Attorney, Agent, or Firm* — Michael Best & Friedrich LLP

(57) ABSTRACT

An electronic power tool device includes an electronic processor, a communication interface in communication with the electronic processor, and a wake-up sensor configured to generate a wake signal for activating the communication interface and the electronic processor responsive to a stimulus. The communication interface is configured to receive a first electronic message that includes an activation state and transmit the first received electronic message to the electronic processor. The electronic processor is configured to control the activation state of the electronic power tool device to allow or prevent operation of the electronic power tool device based on the first received electronic message.

20 Claims, 10 Drawing Sheets

Related U.S. Application Data continuation of application No. 17/499,345, filed on Oct. 12, 2021, now Pat. No. 12,246,429, which is a continuation of application No. 17/126,400, filed on Dec. 18, 2020, now Pat. No. 11,161,231.

(60) Provisional application No. 62/949,884, filed on Dec. 18, 2019.

(51) Int. Cl.

| | |
|---|---|
| ***G06F 9/4401*** | (2018.01) |
| ***G06F 21/44*** | (2013.01) |
| ***H04L 9/08*** | (2006.01) |
| *G06F 9/54* | (2006.01) |

(56) References Cited

U.S. PATENT DOCUMENTS

| | | | |
|---|---|---|---|
| 3,818,187 A | 6/1974 | Lovendusky et al. | |
| 6,005,489 A | 12/1999 | Siegle et al. | |
| 6,586,911 B1 | 7/2003 | Smith et al. | |
| 6,872,121 B2 | 3/2005 | Wiesner et al. | |
| 6,913,087 B1 | 7/2005 | Brotto et al. | |
| 7,298,240 B2 | 11/2007 | Lamar | |
| 7,784,104 B2 | 8/2010 | Innami et al. | |
| 8,169,298 B2 | 5/2012 | Wiesner et al. | |
| 8,542,090 B2 | 9/2013 | Calvet et al. | |
| 9,189,663 B2 | 11/2015 | Goren et al. | |
| 9,449,268 B2 | 9/2016 | Goren et al. | |
| 9,547,965 B2 | 1/2017 | Goren et al. | |
| 9,559,755 B2 | 1/2017 | Breitenbach et al. | |
| 9,665,080 B2 * | 5/2017 | Larsson | H04L 12/40039 |
| 9,672,708 B2 | 6/2017 | Goren et al. | |
| 9,779,601 B2 | 10/2017 | Goren et al. | |
| 9,875,629 B2 | 1/2018 | Goren et al. | |
| 9,895,265 B1 | 2/2018 | DaRosa | |
| 10,002,379 B2 | 6/2018 | Goto et al. | |
| 10,022,272 B1 | 7/2018 | DaRosa | |
| 10,124,455 B2 | 11/2018 | Ito et al. | |
| 10,366,552 B2 | 7/2019 | Dackefjord et al. | |
| 10,406,930 B2 | 9/2019 | Hooker | |
| 10,437,228 B2 | 10/2019 | Kreuzer et al. | |
| 10,482,452 B1 | 11/2019 | Benkreira et al. | |
| 10,510,199 B2 | 12/2019 | Hoossainy et al. | |
| 10,540,874 B2 | 1/2020 | Goren et al. | |
| 10,701,561 B1 | 6/2020 | Sheffield et al. | |
| 11,126,804 B2 | 9/2021 | Huggins et al. | |
| 2004/0045330 A1 * | 3/2004 | Moon | E05B 47/0673 70/107 |
| 2005/0035659 A1 | 2/2005 | Hahn et al. | |
| 2007/0252675 A1 | 11/2007 | Lamar | |
| 2010/0116102 A1 | 5/2010 | Genestout | |
| 2011/0006898 A1 | 1/2011 | Kruest et al. | |
| 2011/0072132 A1 | 3/2011 | Shafer et al. | |
| 2012/0111589 A1 | 5/2012 | Schmidt et al. | |
| 2012/0212321 A1 | 8/2012 | Keener et al. | |
| 2013/0078625 A1 | 3/2013 | Holmes et al. | |
| 2013/0078733 A1 | 3/2013 | Holmes et al. | |
| 2013/0219203 A1 * | 8/2013 | Fujisaki | G06F 3/0625 713/340 |
| 2014/0006295 A1 | 1/2014 | Zeiler et al. | |
| 2014/0289442 A1 | 9/2014 | Tong et al. | |
| 2015/0217422 A1 | 8/2015 | Esenwein | |
| 2015/0220910 A1 | 8/2015 | Beenau et al. | |
| 2015/0228137 A1 | 8/2015 | Chen et al. | |
| 2015/0277428 A1 | 10/2015 | Dackefjord | |
| 2016/0088482 A1 | 3/2016 | Zeiler et al. | |
| 2016/0325391 A1 | 11/2016 | Stampfl et al. | |
| 2017/0337507 A1 | 11/2017 | Curry et al. | |
| 2017/0364901 A1 | 12/2017 | Chandrasekaran et al. | |
| 2018/0143287 A1 | 5/2018 | Dackefjord et al. | |
| 2018/0175617 A1 | 6/2018 | Moessnang et al. | |
| 2018/0204443 A1 | 7/2018 | Nishikawa et al. | |
| 2018/0294655 A1 | 10/2018 | Iwata et al. | |
| 2018/0294656 A1 | 10/2018 | Iwata et al. | |
| 2019/0000675 A1 | 1/2019 | DaRosa | |
| 2019/0027002 A1 | 1/2019 | Esenwein et al. | |
| 2019/0258797 A1 | 8/2019 | Horie et al. | |
| 2020/0059170 A1 | 2/2020 | Brotto et al. | |
| 2020/0090175 A1 | 3/2020 | Davis et al. | |
| 2020/0105078 A1 * | 4/2020 | Nguyen | G06F 3/017 |
| 2020/0265283 A1 | 8/2020 | Brotto et al. | |
| 2020/0342728 A1 | 10/2020 | Brotto et al. | |
| 2021/0122024 A1 | 4/2021 | Obermann et al. | |
| 2021/0243598 A1 | 8/2021 | Sheffield et al. | |
| 2022/0156412 A1 | 5/2022 | Davis et al. | |
| 2022/0156653 A1 | 5/2022 | Abelow | |
| 2023/0164550 A1 | 5/2023 | Davis et al. | |

FOREIGN PATENT DOCUMENTS

| | | |
|---|---|---|
| DE | 10029132 A1 | 1/2002 |
| DE | 10029138 A1 | 1/2002 |
| DE | 102014211296 A1 | 12/2015 |
| DE | 102019134777 A1 | 6/2021 |
| EP | 1455319 B1 | 1/2009 |
| GB | 2583629 A | 11/2020 |
| JP | 2011067311 A | 4/2011 |
| JP | 6536572 B2 | 7/2019 |
| JP | 6690733 B2 | 4/2020 |
| KR | 1020150059771 A | 6/2015 |

OTHER PUBLICATIONS

Extended European Search Report for Application No. 20903428.9 dated Nov. 20, 2023 (9 pages).

Chinese Patent Office Action for Application No. 202080088862.8 dated Mar. 23, 2024 (20 pages including machine English translation).

Chinese Patent Office Action for Application No. 202080088862.8 dated Nov. 21, 2024 (23 pages including machine English translation).

Chinese Patent Office Action for Application No. 202080088862.8 dated Feb. 21, 2025 (21 pages including machine English translation).

* cited by examiner

OUT-OF-BAND POINT OF SALE ACTIVATION FOR ELECTRONIC POWER TOOL DEVICES

RELATED APPLICATIONS

This application is a continuation of U.S. patent application Ser. No. 17/499,345, filed Oct. 12, 2021, which is a continuation of U.S. patent application Ser. No. 17/126,400, now U.S. Pat. No. 11,161,231, filed Dec. 18, 2020, which claims the benefit of U.S. Provisional Patent Application No. 62/949,884, filed Dec. 18, 2019, the entire content of each of which is hereby incorporated by reference.

TECHNICAL FIELD

Embodiments described herein relate to systems and devices for reducing theft of electronic power tool devices.

SUMMARY

In some embodiments, a method is provided for controlling an activation state of an electronic power tool device. The method includes waking the electronic power tool device by providing a stimulus at a wake-up sensor of electronic the electronic power tool device.

Information associated with the electronic power tool device is received by an activation device, and an activation state code is generated by the activation device based on the received information. The activation state code is transmitted by the activation device to the electronic power tool device. The activation state code is configured to control the activation state of the electronic power tool device upon being received at the electronic power tool device. The activation state defines an unlock state or a lock state.

In some embodiments, a method is provided for controlling an activation state of an electronic power tool device. The method includes waking the electronic power tool device responsive to a stimulus at a wake-up sensor of the electronic power tool device. Information associated with the electronic power tool device is sent by the electronic power tool device to an activation device. An activation state code based on the received information is received by the electronic power tool device from the activation device. The activation state code is configured to control the activation state of the electronic power tool device upon being received at the electronic power tool device. The activation state defines an unlock state or a lock state.

In some embodiments, an electronic power tool device is disclosed. The electronic power tool device includes an electronic processor, a communication interface in communication with the electronic processor, and a wake-up sensor configured to generate a wake signal for activating the communication interface and the electronic processor responsive to a stimulus. The communication interface is configured to receive a first electronic message that includes an activation state and transmit the first electronic message to the electronic processor. The electronic processor is configured to control the activation state of the electronic power tool device to allow or prevent operation of the electronic power tool device based on the first received electronic message.

In some embodiments, a method is provided for locking an electronic power tool device. The method includes waking the electronic power tool device responsive to a stimulus at a wake-up sensor of the electronic power tool device, receiving, at a locking device, information associated with the electronic power tool device, and generating, at the locking device, a lock code based on the received information. The method further includes transmitting, by the locking device, the lock code to the electronic power tool device. The lock code is configured to lock the electronic power tool device upon being received at the electronic power tool device.

In some embodiments, an electronic power tool device is disclosed. The electronic power tool device includes a wake-up sensor, an electronic processor and a communication interface in communication with the electronic processor. The wake-up sensor generates a wake signal for activating the communication interface and the electronic processor responsive to a stimulus. The communication interface is configured to receive a first electronic message that includes a lock code. The communication interface is further configured to transmit the first received electronic message to the electronic processor. The electronic processor is configured to prevent operation of the electronic power tool device based on the first received electronic message.

In some embodiments, the stimulus at the wake-up sensor is out-of-band with respect to the first electronic message received at the communication interface.

In some embodiments, a method is provided for unlocking an electronic power tool device. The method includes waking the electronic power tool device responsive to a stimulus at a wake-up sensor of the electronic power tool device, receiving, at an unlocking device, information associated with the electronic power tool device, and generating, at the unlocking device, an unlock code based on the received information. The method further includes transmitting, by the unlocking device, the unlock code to the electronic power tool device. The unlock code is configured to unlock the electronic power tool device upon being received at the electronic power tool device.

In some embodiments, the stimulus at the wake-up sensor is out-of-band with respect to the transmission of the unlock code.

In some embodiments, a method for locking and unlocking a power tool device is disclosed. The method includes waking the electronic power tool device responsive to a first stimulus, receiving a lock signal at the electronic power tool device and preventing operation of the electronic power tool device by an electronic processor of the electronic power tool device based on receiving the lock signal. The method further includes waking the electronic power tool device responsive to a second stimulus, receiving an unlock signal at the electronic power tool. The unlock signal is received based on an authorized purchase of the electronic power tool being verified. The method further includes permitting operation of the electronic power tool device by the electronic processor of the electronic power tool device based on receiving the unlock signal.

In some embodiments, the electronic power tool device is at least one selected from the group of a battery-powered power tools, a corded power tool, a power tool battery pack used to power battery-powered power tools, or an electronic device powered by a power tool battery pack.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Other aspects of the invention will become apparent by consideration of the detailed description and accompanying drawings.

DETAILED DESCRIPTION

Loss prevention for retailers is a high priority, especially for battery-powered power tools. Due to the compact size, ease of use, and desirability of battery-powered power tools, theft of these devices has increased. This increase in theft has been detrimental to the retail stores selling the power tools. Accordingly, systems, devices, and methods for reducing and preventing theft of battery-powered power tools are desirable.

Embodiments disclosed herein relate to systems, devices, and methods for preventing operation of a battery-powered power tool until the battery-powered power tool has been legitimately purchased, and the purchase has been verified. An out-of-band technique is employed for initiating the hardware for registering and enabling the battery-powered power tool.

Figure 1:
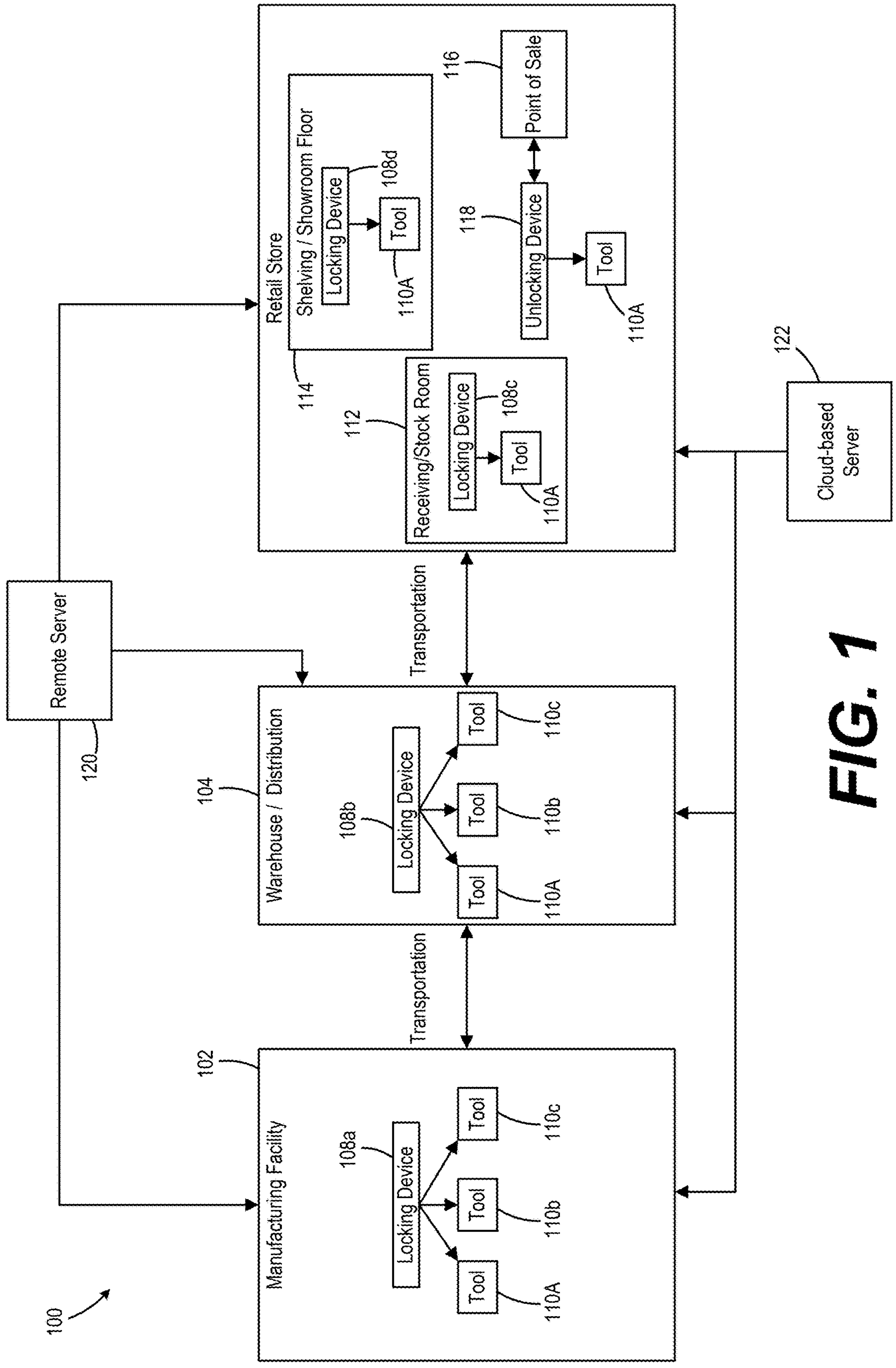
FIG. 1 illustrates a system for locking and unlocking battery-powered power tools, according to some embodiments.

FIG. 1 illustrates an example system 100 for locking and unlocking battery powered power tools throughout the supply chain. The supply chain is shown to include a manufacturing facility 102, a warehouse/distribution center 104, and a retail store 106. A supply chain may include multiple manufacturing facilities 102, warehouse/distribution centers 104, and/or retail stores 106, and the supply chain shown in FIG. 1 is for example purposes only. Additional intermediate facilities or warehouses may also be utilized in a supply chain. The manufacturing facility 102 is shown to include a locking device 108*a* and power tool devices 110, identified as power tool devices 110*a-c*. Only three power tool devices 110 are shown for illustration purposes, but the system 100 may include any number of power tool devices 110. As described herein, the power tool devices 110 may be any battery-powered power tools, corded power tools, power tool battery packs used to power battery-powered power tools, or electronic devices powered by power tool battery packs that are also able to power battery-powered power tools (i.e., when disconnected from an electronic device and connected to a battery-powered power tool). Examples of battery-powered power tools and corded power tools include, but are not limited to: drills, hammer drills, reciprocating saws, circular saws, drivers, lights, radios, impact drivers, drain snakes, power ratchets, miter saws, die grinders, mixers, grinders, sanders, nailers, table saws, and the like. Examples of electronic devices powered by power tool battery packs include motorized and non-motorized devices including, but not limited to: worksite fans, worksite radios, worksite lights, and test and measurement devices (for example, distance measurers, infrared thermometers, borescope cameras, or stud finders). In other examples, in addition to or in place of the power tool devices 110*a-c*, the system 100 includes other battery-powered devices, and the following discussion of the locking and unlocking features and methods described below similarly applies to such other battery-powered devices. The power tool devices 110*a-c*, as well as those described further herein, may be referred to simply as "tools" for the sake of brevity and clarity, and the terms should be understood to be used interchangeably. The locking device 108*a* may be configured to communicate with one or more of the tools 110*a-c* to prevent operation of the tools 110*a-c*, as will be described in more detail below.

Upon leaving the manufacturing facility 102, one or more of the tools 110*a-c* may be transported to various facilities as shown in FIG. 1. In some embodiments, the locking device 108*a* locks the tools 110*a-c* prior to the tools being transported. For example, the locking device 108*a* may be coupled to a shipping bay to automatically lock all tools 110*a-c* upon leaving the transportation bay. In some embodiments, the tools 110*a-c* are selectively locked based on the ultimate destination. For example, tools 110*a-c* that are slated to be transported ultimately to a retail store (e.g. brick and mortar location) may be locked via locking device 108*a* prior to being loaded for transport, while tools 110*a-c* that are slated to be transported to an online retailer may not be locked prior to transport.

Some or all of the tools 110*a-c* may be received at the warehouse/distribution center 104, as shown in FIG. 1. The warehouse/distribution center 104 may serve as an intermediate location in the supply chain for tools 110*a-c*. The warehouse/distribution center 104 includes one or more locking devices 108*b*, and tools 110*a-c*. While tools 110*a-c* are shown in FIG. 1 as being within the warehouse/distribution center 104, it is understood that multiple tools may be located in the warehouse/distribution center 104, and that the tools 110*a-c* are for example purposes only. The locking device 108*b* may be similar to locking device 108*a*, and will be described in more detail below. As described above, the locking device 108*b* are configured to communicate with one or more tools 110*a-c*, and to "lock" the tools 110*a-c* to prevent their operation, as will be described below in more detail. In some examples, the locking device 108*b* is configured to lock the tools 110*a-c* upon arrival to the warehouse/distribution center 104. In other examples, the locking device 108*b* locks the tools 110*a-c* when the tools 110*a-c* leave the warehouse/distribution center 104. In some examples, as described above, the locking device 108*b* is configured to selectively lock the tools 110*a-c* based on their ultimate destination (e.g. brick and mortar retail, online retail, etc.). Upon leaving the warehouse/distribution center 104, the tools 110*a-c* may be put into transportation again, as shown in FIG. 1.

Some or all of tools 110*a-c* may be received at the retail store 106. In some examples, the tools 110*a-c* may be received at multiple retail stores 106, and it is understood that the retail store 106 in FIG. 1 is for example purposes only. The retail store 106 may include a receiving/stock room area 112, a shelving/showroom area 114, and a point of sale 116. The receiving/stock room area 112 may include a locking device 108*c* and the tool 110*a*. It should be understood that the receiving/stock room may include more tools or fewer tools, and that in some instances all tools received at the retail store 106 may be located in the receiving/stock room area 112 at some point in the retail system. The locking device 108*c* is configured to lock the tool 110*a* upon receiving the tool 110*a* at the receiving/stock room area 112. For example, the receiving/stock room area 112 may position the locking device 108*c* at a receiving dock, and the locking device 108*c* may be configured to lock all tools upon their receipt at the receiving/stock room area 112. In other examples, the locking device 108*c* is a portable or hand-held device that lets a user individually lock the tool 110*a* upon the tool 110*a* being received. In still further examples, the locking device 108*c* may be configured to lock the tool 110*a* when it is logged in, or otherwise marked as received by the retail store 106.

The shelving/showroom area 114 may further include a locking device 108*d* in communication with the tool 110*a*. The locking device 108*d* is configured to lock the tool 110*a* when the tool 110*a* is placed on the shelving/showroom area 114. For example, the locking device 108*d* may be a handheld device that is used by an employee of the retail store to lock the tool 110*a* upon placing the tool 110*a* onto the shelving/showroom area 114. However, other locking device designs are contemplated.

The point of sale 116 may be a kiosk or cashier station where a customer completes the purchase of a tool, such as the tool 110*a*. In some embodiments, the point of sale 116 includes an electronic processor, memory, and a communication interface, and is in communication with one or more unlocking device 118. In some embodiments, the unlocking device 118 is directly coupled to the point of sale 116. In other embodiments, the unlocking device 118 is in communication with the point of sale 116 in various ways, such as via a wireless connection, a networked connection, or the like. The unlocking device 118 is configured to unlock a tool, such as the tool 110*a*. The unlocking device 118 will be described in more detail below. In one example, the unlocking device 118 is configured to unlock the tool 110*a* upon receiving a communication from the point of sale 116 indicating that the tool has been purchased by a customer. Thus, the unlocking device 118 can allow the tool 110*a* to be unlocked upon a bona fide purchase of the tool 110*a* being verified via the point of sale 116.

The system 100 further includes a remote server 120 and a cloud-based server 122. The remote server 120 and/or the cloud-based server 122 are configured to interface with the locking devices 108*a-d*, the unlocking device 118, the point of sale 116, and, in some instances, the tools 110*a-c*. In one embodiment, the remote server 120 and/or the cloud-based server 122 provide communication between the manufacturing facility 102, the warehouse/distribution center 104, and/or the retail store 106, as well as the devices therein. In some embodiments, the system 100 may have one or both of the remote server 120 and/or the cloud-based server 122. In other embodiments, the system 100 may not have either the remote server 120 and/or the cloud-based server 122.

Figure 2:
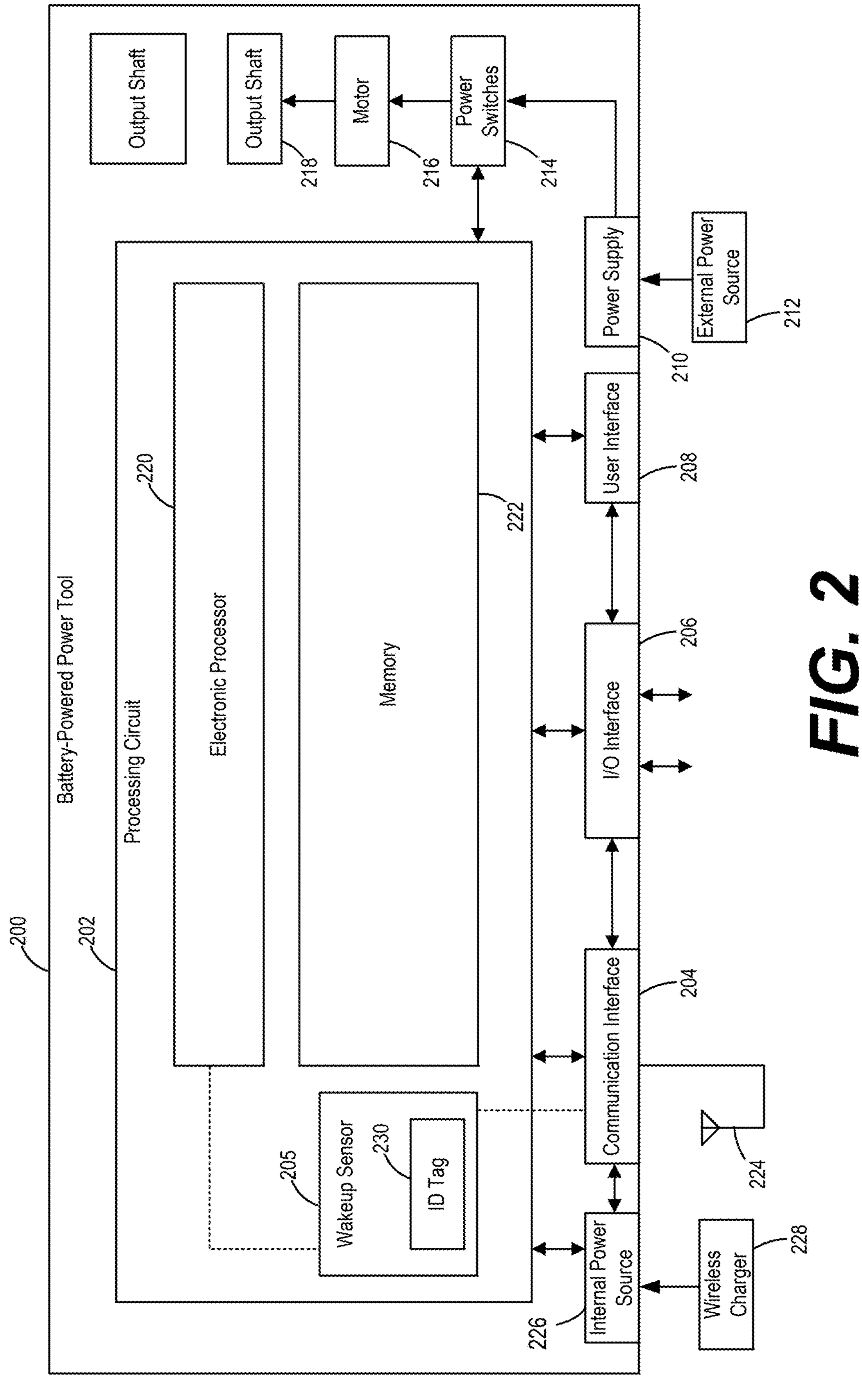
FIG. 2 is a block diagram of an example battery-powered power tool, according to some embodiments.

Turning now to FIG. 2, a block diagram of an electronic power tool 200, such as tools 110*a-c* is shown, according to some embodiments. The power tool 200 may be any of the battery-powered power tools described above in regards to FIG. 1. The block diagram of electronic power tool 200 is for example purposes and it is understood that other designs and components are contemplated for various electronic power tools. The electronic power tool 200 (hereinafter "tool") includes a processing circuit 202, a communication interface 204, a wake-up sensor 205, an Input/Output ("I/O") interface 206, a user interface 208 a power supply 210, an external power source 212, one or more power switches 214, a motor 216, and an output shaft 218. The processing circuit 202 may include an electronic processor 220 and a memory 222. The processing circuit 202 may be communicably connected to one or more of the communication interface 204, the I/O interface 206, the user interface 208, the power supply 210, and the power switches 214. The electronic processor 220 may be implemented as a programmed microprocessor, an application specific integrated circuit (ASIC), one or more field programmable gate arrays (FPGA), a group of processing components, or other suitable electronic processing components.

The memory 222 (e.g. memory, memory unit, storage device, etc.) includes one or more devices (e.g., RAM, ROM, Flash memory, hard disk storage, etc.) for storing data and/or computer code for completing or facilitating the various processes, layers and modules described herein. Memory 222 can be or include volatile memory or non-volatile memory. Memory 222 can include database components, object code components, script components, or any other type of information structure for supporting the various activities and information structure described in the present application. According to one example, the memory 222 is communicably connected to the electronic processor 220 via the processing circuit 202 and can include computer code for executing (e.g., by the processing circuit 202 and/or the electronic processor 220) one or more processes described herein.

The communication interface 204 is configured to facilitate communications between the processing circuit 202 and one or more external devices and/or networks. The communication interface 204 can be or include wired or wireless communications interfaces (e.g., jacks, antennas, transmitters, receivers, transceivers, wire terminals, etc.) for conducting data communications between the tool 200 and one or more external devices, such as the locking devices and unlocking devices described herein. In some embodiments, the communication interface 204 is a wireless communication interface such as cellular (3G, 4G, LTE, CDMA, 5G, etc.), Wi-Fi, Wi-MAX, ZigBee, ZigBee Pro, Bluetooth, Bluetooth Low Energy (BLE), RF, LoRa, LoRaWAN, Near Field Communication (NFC), Radio Frequency Identification (RFID), Z-Wave, 6LoWPAN, Thread, WiFi-ah, and/or other wireless communication protocols. Additionally, the communication interface 204 may include wired interfaces such as Universal Serial Bus (USB), USB-C, Firewire, Lightning, CAT5, universal asynchronous receiver/transmitter (UART), serial (RS-232, RS-485), etc. In some embodiments, the communication interface 204 communicates via an antenna 224.

The I/O interface 206 allows for communication with one or more external devices, which may include product accessories. The I/O interface 206 may further facilitate communication with other components inside the tool 200, such as the communication interface 204 and the user interface 208, as well as the processing circuit 202. The user interface 208 may include a trigger, a mode selector, or other user accessible controls that can generate control signals in response to the user actuating or operating the associated component of the user interface 208. In some embodiments, the user interface 208 may include a display or other visual indicating device that may provide a status of the tool 200, such as an operating status, a battery charge status, a locked/unlocked status, etc.

The control signals from the user interface 208 may be transmitted to the processing circuit 202, which may be configured to activate the one or more power switches 214 to draw power from the power supply 210 and external power source 212 and drives the motor 216. In one embodiment, the power switches 214 may be Field Effect Transistors (FETs). However, other power switch types are contemplated, such as BJT transistors, CMOS transistors, insulated gate bipolar transistors (IGBT), etc. By selectively enabling and disabling the power switches 214, power from the power supply 210 is selectively applied to stator windings of the motor 216 to cause rotation of a rotor of the motor 216. The rotating rotor of the motor 216 drives the output shaft 218. Although not shown, the processing circuit 202 and other components 235 of the tool 200 are also electrically coupled to and receive power from the external power source 212. In some embodiments, the external power source is a power tool battery pack that is selectively engageable with the power tool and includes one or more battery cells, such as a lithium-ion (Li-Ion) battery cells or NiCad battery cells. In some embodiments, the tool 200 is a corded power tool and the external power source 212 is utility grid-powered alternating current (AC) outlet.

As noted above, while one or more of the power tool devices 110 of FIG. 1 may be a battery-powered power tool, such as the tool 200 illustrated in FIG. 2, the power tool devices 110 of FIG. 1 may also be a power tool battery pack (see FIG. 7, discussed below) or another electronic device powered by power tool battery pack. With respect to these electronic devices powered by power tool battery packs, the block diagram of the tool 200 in FIG. 2 similarly applies to motorized electronic devices powered by power tool battery packs. Further, the block diagram of the tool 200 in FIG. 2 is similarly applicable to non-motorized electronic devices powered by power tool battery packs, except that, in place of one or more of the power switches 214, motor 216, and output shaft 218, a non-motorized load is provided (e.g., a light, speaker, or sensor).

The wake-up sensor 205 generates a wake signal for activating the tool 200 to allow locking or unlocking of the tool 200. To reduce battery power consumed while the tool 200 is in the supply chain prior to being delivered to a purchaser, various elements of the tool 200, such as the electronic processor 220, the communication interface 204, and the I/O interface 206 may be placed into a deep sleep state. The wake-up sensor 205 generates the wake signal responsive to a predetermined stimulus to activate the elements of the tool 200 used to perform locking or unlocking features. In some embodiments, the wake-up sensor 205 responds to an electrical stimulus, such as a magnetic swipe, an electronic communication, or a switch activation. In some embodiments, the wake-up sensor 205 responds to a mechanical stimulus, such as a particular sound, motion, or vibration pattern.

Figure 7:
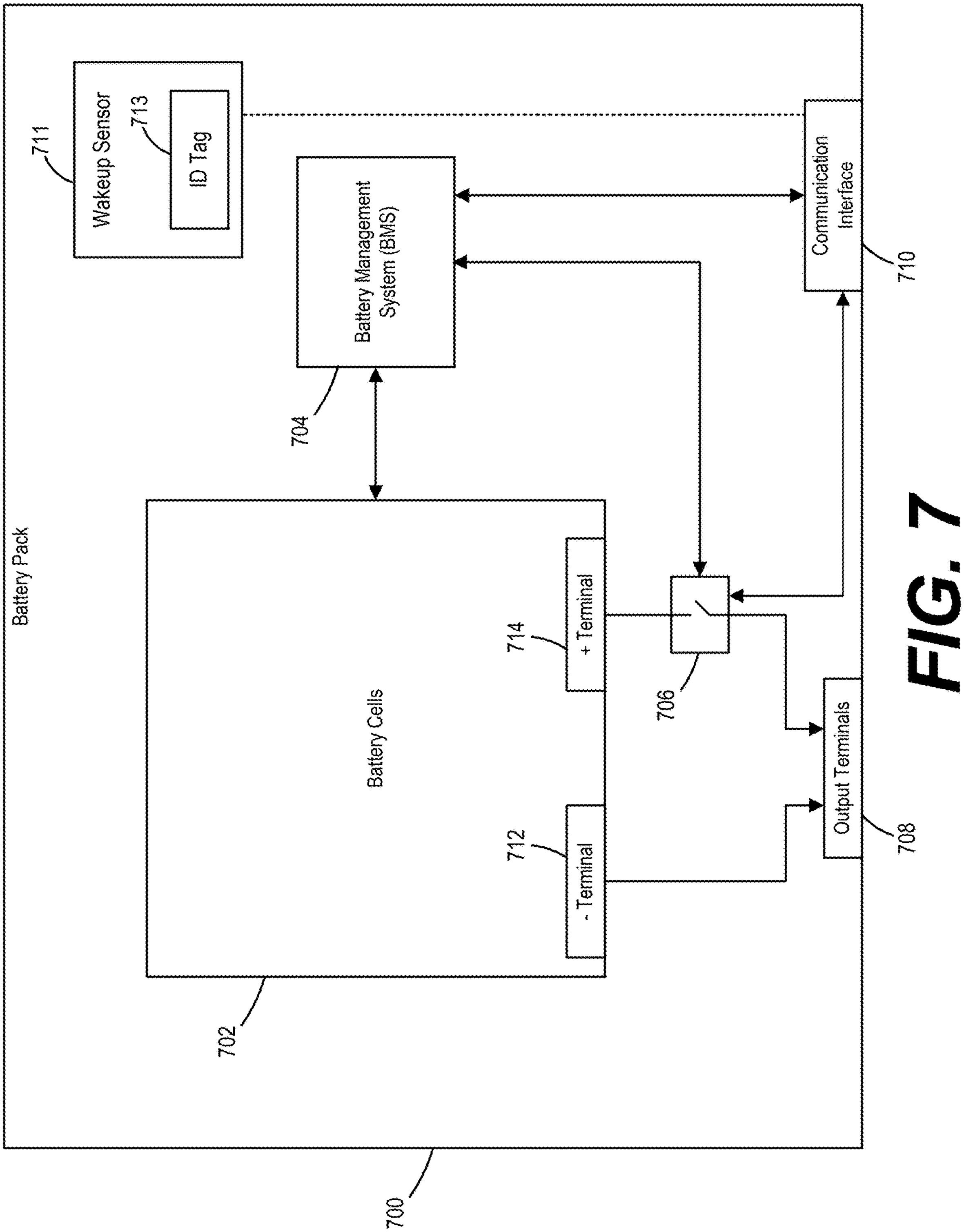
FIG. 7 is a block diagram of an example external rechargeable battery pack, according to some embodiments.

As noted above, in the external power source 212 is a power tool battery pack, such as illustrated in further detail in FIG. 7, that powers the various components within the power tool 200. However, in some embodiments, the power tool battery pack is not provided for sale with the power tool 200 or, even if sold with the power tool 200, it is not coupled to the power tool 200 at the time of sale. Accordingly, in some embodiments, an internal power source 226 is provided to power select elements of the power tool 200, such as the processing circuit 202 and the communication interface 204. The internal power source 212 may be, for example, a coin cell battery or another small battery cell. In some embodiments, the internal power source 212 may be charged by the power supply 210 when an external power source 12 is coupled to the power supply 210. In some embodiments, the internal power source 226 includes a wireless charging circuit as is configured to be charged by a wireless charger 228. The internal power source 226 may be charged by the wireless charger 228 in the manufacturing facility 102, the warehouse/distribution center 104, or the retail store 106 (e.g., where the wireless charger 228 is integrated into or attached to a retail shelf within the store). For example, the wireless charger 228 may generate a varying current through a transmitter antenna, which generates a varying electromagnetic field, which induces current in a receiving coil of the wireless charging circuit of the internal power source 212 through induction. The induced current is then used as a charging current to increase the state of charge of the internal power source 226. In some embodiments, the tool 200 provides an alert, such as an audible alert or a status indicator, on the user interface 208 when the charge on the internal power source 226 falls below a threshold, as determined by the electronic processor 220. In some embodiments, the internal power source 226 is provided as an external power source that connects to terminals on the power tool 200.

In some embodiments, the wake-up sensor 205 includes an identification tag 230, such as a radio frequency identification (RFID) tag or near field communication (NFC) tag, which generates the wake signal responsive to a transaction being conducted with the identification tag 230, such as a read transaction or a write transaction implemented by an interrogator (e.g., the locking device 300 or unlocking device 400). For example, the interrogator may generate a varying current through a transmitter antenna, which generates a varying electromagnetic field to induce current in a receiving coil of the identification tag 230 through induction. The induced current then powers a circuit of the identification tag 230 that generates the wake signal. In one example, the circuit may include a processor that, for example, compares an encoded signal in the interrogator transmission to a stored code (e.g., stored in a memory element of the wake-up sensor 205). In the case of a match, the wake-up sensor 205 outputs the wake signal.

In some embodiments, the location of the identification tag may be marked by a visual indicator, such as a symbol, on a housing of the tool 200. In some embodiments, an external antenna may be provided in the packaging of the tool 200 that communicates with the wake-up sensor 205. A symbol for interfacing with the wake-up sensor 205 may be provided on an outer surface of the packaging. Multiple interface locations may be marked if the packaging contains multiple tools 200. In some embodiments, the interrogator may have sufficient strength to read multiple identification tags concurrently. Information associated with a scanning code on the packaging, such as a universal product code (UPC), serial number, or the like, may indicate the number of tools 200 in the package. In some embodiments, information indicating the number of tools 200 in the package may be stored in the identification tag.

In some embodiments, the wake-up sensor 205 includes a magnetic strip card reader wherein a card (e.g., of the retailer) is swiped in the reader. The wake-up sensor 205, in response to the swipe, determines an encoded signal, compares the encoded signal to a stored code (e.g., stored in a memory element of the wake-up sensor 205). In the case of a match, the wake-up sensor 205 outputs the wake signal.

In some embodiments, the wake-up sensor 205 includes a motion sensor, such as an accelerometer, and a processing circuit to receive signals from the motion sensor. The motion sensor outputs signals in response to, and indicative of, predetermined motions, such as accelerations, detected by the accelerometer. In one embodiment, the processing circuit compares the received output signals from the motion sensor to a threshold value (e.g., stored in a memory element of the wake-up sensor 205), and when the motion exceeds the threshold value, the wake signal is generated. Accordingly, in one example, the wake-up sensor 205 is configured to output the wake signal in response to the power tool 200 being shaken. The threshold can be set to various values, the set value thereby specifying the intensity level of shaking that will cause the wake-up sensor 205 to generate the wake signal. In another example, a processing circuit compares the received output signals from the motion sensor to a predetermined pattern of signals corresponding to a predetermined motion (e.g., stored in a memory element of the wake-up sensor 205). When the motion signals match the predetermined pattern, the wake signal is generated. Accordingly, in one example, the wake-up sensor 205 is configured to output the wake signal in response to the power tool 200 being moved in a predetermined motion (e.g., up, down, left and then right, or in a circle).

As noted, in other embodiments, the wake-up sensor 205 includes other sensing elements, but may operate using similar principals as described above. For example, the wake-up sensor 205 may include a push-button switch (when depressed, the wake signal is generated) or a microphone (when a certain audio signal pattern is matched or threshold is reached, the wake signal is generated). In some embodiments, other types of wake-up sensors 205 are provided.

Figure 3:
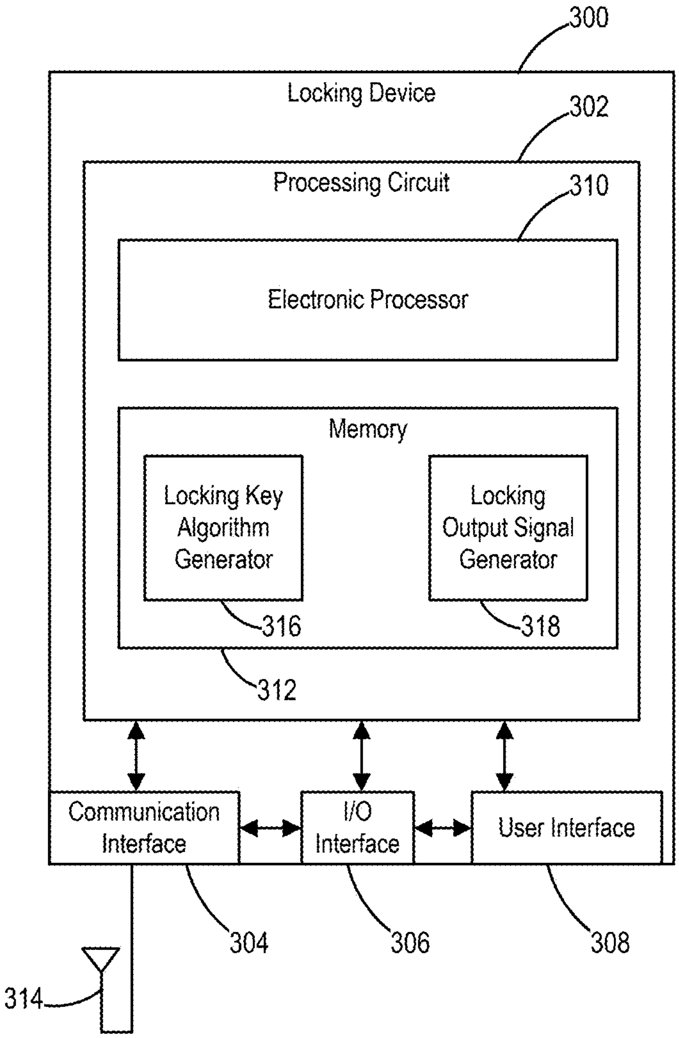
FIG. 3 is a block diagram of an example locking device of FIG. 1, according to some embodiments.

Turning now to FIG. 3, a block diagram illustrating an example locking device 300 is provided, according to some embodiments. The locking device 300 may be similarly configured to the locking devices 108*a-d*, described above. The locking device 300 includes a processing circuit 302, a communication interface 304, an I/O interface 306, and a user interface 308. The processing circuit 302 may be communicably connected to one or more of the communication interface 304, the I/O interface 306, and the user interface 308. The processing circuit 302 includes an electronic processor 310 and a memory 312. The electronic processor 310 may be implemented as a programmed microprocessor, an application specific integrated circuit (ASIC), one or more field programmable gate arrays (FPGA), a group of processing components, or other suitable electronic processing components.

The memory 312 (e.g. memory, memory unit, storage device, etc.) includes one or more devices (e.g., RAM, ROM, Flash memory, hard disk storage, etc.) for storing data and/or computer code for completing or facilitating the various processes, layers and modules described herein. Memory 312 can be or include volatile memory or non-volatile memory. Memory 312 can include database components, object code components, script components, or any other type of information structure for supporting the various activities and information structure described in the present application. According to one example, the memory 312 is communicably connected to the electronic processor 310 via the processing circuit 302 and can include computer code for executing (e.g., by the processing circuit 302 and/or electronic processor 310) one or more processes described herein.

The communication interface 304 is configured to facilitate communications between the processing circuit 302 and one or more external devices and/or networks. The communication interface 304 can be or include wired or wireless communications interfaces (e.g., jacks, antennas, transmitters, receivers, transceivers, wire terminals, etc.) for conducting data communications between the locking device 300 and one or more external devices, such as one or more battery-powered tools, as described herein. In some embodiments, the communication interface 304 is a wireless communication interface such as cellular (3G, 4G, LTE, CDMA, 5G, etc.), Wi-Fi, Wi-MAX, ZigBee, ZigBee Pro, Bluetooth, Bluetooth Low Energy (BLE), RF, LoRa, LoRaWAN, Near Field Communication (NFC), Radio Frequency Identification (RFID), Z-Wave, 6LoWPAN, Thread, WiFi-ah, and/or other wireless communication protocols. Additionally, the communication interface 304 may include wired interfaces such as Universal Serial Bus (USB), USB-C, Firewire, Lightning, CAT5, universal asynchronous receiver/transmitter (UART), serial (RS-232, RS-485), etc. In some embodiments, the communication interface 304 communicates via an antenna 314.

The I/O interface 306 allows for communication with one or more external devices, such as an electronic power tool. The I/O interface 306 may further facilitate communication without other components inside the locking device 300, such as the communication interface 304 and the user interface 308, as well as the processing circuit 302.

In some embodiments, the communication interface 304 of the locking device 300 employs one protocol to communicate with the wake-up sensor 205 on the tool, such as an RFID or NFC protocol, and another protocol for communicating via the communication interface 204 with the electronic processor 220 of the tool 200, such as a BLE or other wireless protocol. In that respect, the communication with the wake-up sensor 205 is out-of-band with respect to the communication with the electronic processor 220 via the communication interface 204. Similarly, if the wake-up sensor 205 operates responsive to a mechanical stimulus, its operation is out-of-band with respect to the communication with the electronic processor 220 via the communication interface 204.

The user interface 308 may include various interface elements to allow for a user to interface with the locking device. In some embodiments, the user interface 308 may include user interface elements such as a display (LCD, LED, etc.), keyboards, touchscreens, touchpads, microphones, speakers, scanning devices, sensors, or other user interface elements that can allow the user to provide input directly to the locking device 300. In some examples, a user may be able to instruct the locking device 300 to execute one or more processes, such as locking a battery-powered power tool, as will be described in more detail herein.

In some embodiments, the memory 312 is configured to store one or more processes for execution by the electronic processors 310 and/or the processing circuit 302. For example, the memory 312 may include a locking key algorithm generator 316. The locking key algorithm generator may be configured to generate one or more locking keys, which can be provided to a battery-powered power tool, such as the tool 200, via the communication interface 304 and/or the I/O interface 306. The locking keys may be generated based on one or more parameters, such as battery-powered tool information. Battery-powered tool information may include one or a combination of manufacture date, serial number, model number, product ID, etc. In some embodiments, a user may input the battery-powered tool information via the user interface 308. In one embodiment, the locking code is generated using a hashing function to combine two or more elements of the battery-powered tool information. In other embodiments, the battery-powered tool information is provided to the locking device 300 via the communication interface 304 and/or the I/O interface 306. In one embodiment, the generated locking key is unique to a specific battery-powered power tool. The memory may further include a locking output signal generator 318. The locking output signal generator 318 may generate the signal to be provided to battery-powered power tool to instruct the battery-powered power tool to "lock," thereby preventing operation of the battery-powered power tool. In one example, the locking output signal is transmitted to the battery-powered power tool via the communication interface 304. In other examples, the locking output signal is provided to the battery-powered power tool via the user interface 308. In one embodiment, the locking output signal includes the locking key generated by the locking key algorithm generator 316.

In some examples, the locking device 300 may be a standalone device. For example, the locking device 300 may be a handheld device or a fixed device, such as fixed device positioned within a manufacturing facility, warehouse, distribution site, or retail store, as described above. In still further examples, the locking device 300 may be integrated into a user/customer device, such as a smartphone, tablet computer, personal computer, or other electronic device. For example, a user/customer may install an application or other program onto their device. The application or other program may be configured to allow the user/customer device to operate as the locking device 300, and can utilize the hardware, such as the user interface and communication interface (e.g. Bluetooth, Wi-Fi, cellular, etc.) of the user/customer device, to perform a locking function on a tool. In one example, the tool may be locked prior to purchase, as described above. In other examples, an owner of the tool may utilize their personal device as a locking device to lock their tool, such as if it is stolen, or being put into storage.

Figure 4:
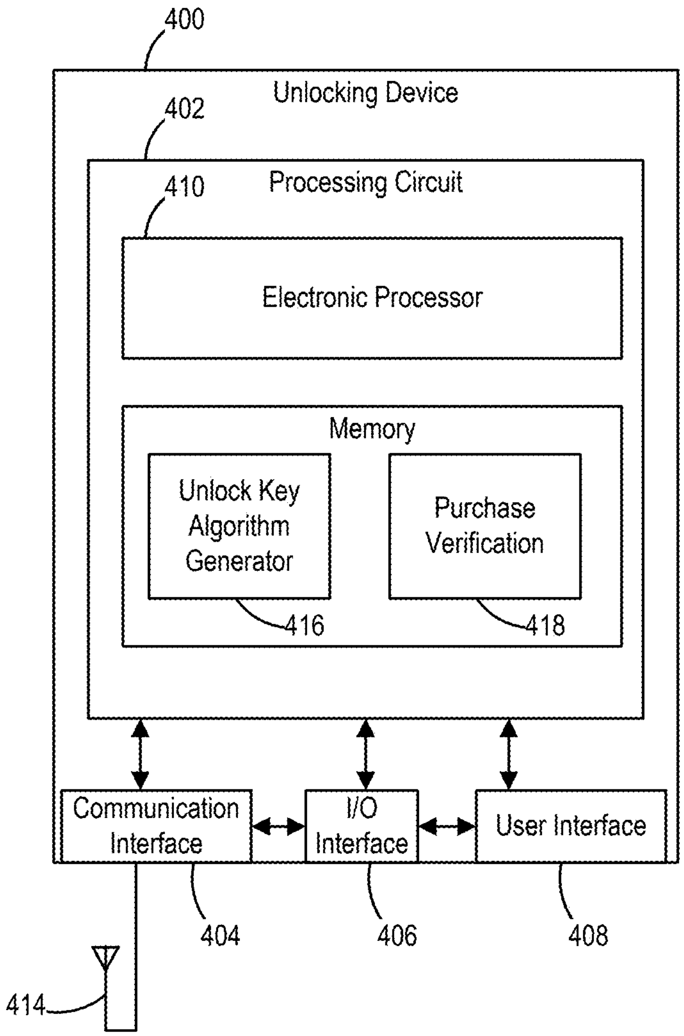
FIG. 4 is a block diagram of an example unlocking device of FIG. 1, according to some embodiments.

Turning now to FIG. 4, a block diagram illustrating an example unlocking device 400 is provided, according to some embodiments. The unlocking device 400 may be similarly configured to the unlocking device 118, described above. The unlocking device 400 includes a processing circuit 402, a communication interface 404, an I/O interface 406, and a user interface 408. The processing circuit 402 may be communicably connected to one or more of the communication interface 404, the I/O interface 406, and the user interface 408. The processing circuit 402 may include an electronic processor 410 and a memory 412. The electronic processor 410 may be implemented as a programmed microprocessor, an application specific integrated circuit (ASIC), one or more field programmable gate arrays (FPGA), a group of processing components, or other suitable electronic processing components.

The memory 412 (e.g. memory, memory unit, storage device, etc.) can include one or more devices (e.g., RAM, ROM, Flash memory, hard disk storage, etc.) for storing data and/or computer code for completing or facilitating the various processes, layers and modules described herein. The memory 412 can be or include volatile memory or non-volatile memory. The memory 412 can include database components, object code components, script components, or any other type of information structure for supporting the various activities and information structure described in the present application. According to one example, the memory 412 is communicably connected to the electronic processor 410 via the processing circuit 402 and can include computer code for executing (e.g. by the processing circuit 402 and/or electronic processor 410) one or more processes described herein.

The communication interface 404 is configured to facilitate communications between the processing circuit 402 and one or more external devices and/or networks. The communication interface 404 can be or include wired or wireless communications interfaces (e.g., jacks, antennas, transmitters, receivers, transceivers, wire terminals, etc.) for conducting data communications between the unlocking device 400 and one or more external devices, such as one or more battery-powered tools, as described herein. In some embodiments, the communication interface 404 is a wireless communication interface such as cellular (3G, 4G, LTE, CDMA, 5G, etc.), Wi-Fi, Wi-MAX, ZigBee, ZigBee Pro, Bluetooth, Bluetooth Low Energy (BLE), RF, LoRa, LoRaWAN, Near Field Communication (NFC), Radio Frequency Identification (RFID), Z-Wave, 6LoWPAN, Thread, WiFi-ah, and/or other wireless communication protocols. Additionally, the communication interface 404 may include wired interfaces such as Universal Serial Bus (USB), USB-C, Firewire, Lightning, CAT5, universal asynchronous receiver/transmitter (UART), serial (RS-232, RS-485), etc. In some embodiments, the communication interface 404 communicates via an antenna 414.

In some embodiments, the communication interface 404 of the unlocking device 400 employs one protocol to communicate with the wake-up sensor 205 on the tool, such as an RFID or NFC protocol, and another protocol for communicating via the communication interface 204 with the electronic processor 220 of the tool 200, such as a BLE or other wireless protocol. In that respect, the communication with the wake-up sensor 205 is out-of-band with respect to the communication with the electronic processor 220 via the communication interface 204. Similarly, if the wake-up sensor 205 operates responsive to a mechanical stimulus, its operation is out-of-band with respect to the communication with the electronic processor 220 via the communication interface 204.

The I/O interface 406 may allow for communication with one or more external devices, such as an electronic power tool. The I/O interface 406 may further facilitate communication with other components inside the unlocking device 400, such as the communication interface 404 and the user interface 408, as well as the processing circuit 402.

The user interface 408 may include various interface elements to allow for a user to interface with the locking device. In some embodiments, the user interface 408 includes user interface elements such as a display (LCD, LED, etc.), keyboards, touchscreens, touchpads, or other user interface elements that can allow the user to provide input directly to the unlocking device 400. In some examples, a user may be able to instruct the unlocking device 40 to execute one or more processes, such as unlocking a battery-powered power tool, as will be described in more detail herein.

In some embodiments, the memory 412 is configured to store one or more processes for execution by the electronic processors 410 and/or the processing circuit 402. For example, the memory 412 may include an unlock key algorithm generator 416. The unlock key algorithm generator 416 configures the electronic processor to generate one or more unlocking keys, which can be provided to a battery-powered power tool via the communication interface 304 and/or the I/O interface 406. The unlocking keys may be generated based on one or more parameters, such as battery-powered tool information. Battery-powered tool information may include one or a combination of manufacture date, serial number, model number, product ID, purchase time, purchase date, purchase location, etc. In some embodiments, a user may input the battery-powered tool information via the user interface 408. In other embodiments, the battery-powered tool information is provided to the unlocking device 400 via the communication interface 404 and/or the I/O interface 406. In some embodiments, the unlocking device 400 may receive battery-powered tool information from a point-of-sale, such as point of sale 116. In one embodiment, the generated locking key is unique to a specific battery-powered power tool. The memory may further include a purchase verification process 418. The purchase verification process 418 configures the electronic processor 410 to receive one or more electronic messages indicating a purchase of a battery-powered power tool has been completed. In some embodiments, the purchase verification process 418 configures the electronic processor 410 to receive purchase details from one or more sources, such as point of sale 116. In some embodiments, the purchase verification process 418 configures the electronic processor 410 to communicate with the unlock key algorithm generator 416 to provide the purchase verification data to the unlock key algorithm generator 416.

In some examples, the unlocking device 400 is a standalone device. For example, the unlocking device 400 may be a handheld device or a fixed device, such as fixed device positioned at the exit of the retail store. In some examples, the unlocking device is integrated into the point of sale. For example, the unlocking device 400 may be integrated with a scanning device of the point of sale, such that when the tool is "scanned" as part of the purchase process, the unlocking device can unlock the tool. In still further examples, the unlocking device 400 is integrated into a user/customer device, such as a smartphone, tablet compute, personal computer, or other electronic device. For example, a user/customer may install an application or other program onto their device. The application or other program may be configured to allow the user/customer device to operate as the unlocking device 400, and can utilize the hardware, such as the user interface and communication interface (e.g. Bluetooth, Wi-Fi, cellular, etc.) of the user/customer device, to perform an unlocking function on a purchased tool. Further, the application may communicate with the point of sale or the cloud-based server 122 to verify purchase of the tool.

Figure 5:
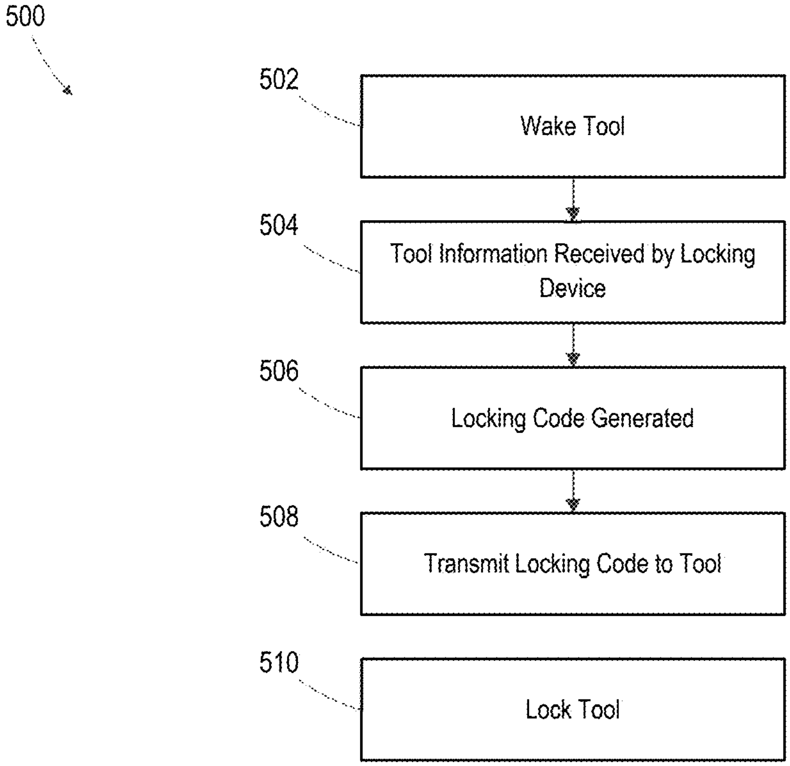
FIG. 5 is a flowchart illustrating a control method for locking a battery-powered power tool.

Turning now to FIG. 5, a flowchart illustrating a battery-powered power tool locking process 500 is shown, according to some embodiments. The process 500 may be performed by, and is described with respect to, components described above (e.g., the locking device 300 and the power tool 200); however, in some embodiments, the other locking devices, tools, and components are used to perform the process 500. At process block 502, the tool 200 is woken by providing the appropriate stimulus to the wake-up sensor 205. For example, the identification tag 230 may be interrogated by the locking device 300, a magnetic swipe may be performed, a predetermined mechanical action may be performed, or another of the aforementioned stimuli may be provided to the wake-up sensor 205. Responsive to the wake signal from the wake-up sensor 205, at least some of the elements of the tool 200, such as the electronic processor 220, the communication interface 204, and the I/O interface 206, are transitioned from a deep sleep state to an active state to allow communication with the locking device 300.

In one example embodiment, the locking device 300 interrogates the identification tag 230 as described above, which causes the wake-up sensor 205 to generate the wake signal. The wake signal is provided to the communication interface 204, which includes a wireless radio (for example, a BLE radio or a Bluetooth radio). The wake signal then serves as an interrupt signal to a processor of the communication interface 204, which causes the processor to exit a standby software code loop (of the deep sleep state) and to jump to main software code loop (of the woken state). Once awakened, the communication interface 204 may communicate a further wake signal to the electronic processor 220. The further wake signal may similarly serve as an interrupt that causes the electronic processor 220 to exit a standby software code loop and to jump to a main software code loop. In this example, the communication interface 204, as well as the electronic processor 220 and other elements of the processing circuit 202 may be powered by the internal power source 226 during this process block 502 (and while the external power source 212 may be disconnected from the power supply 210). In some embodiments, the wake signal is sent to both the communication interface 204 and the electronic processor 220 in parallel.

At process block 504, tool information is received by the locking device 300. The tool information may include a UPC code, a serial number, product model number, RFID identification number, Bluetooth address, etc. In some examples, the tool information is any information that is unique to a particular electronic power tool. The tool information may be generated during the manufacture of the tool, or be provided at various points along the supply chain, such as at a warehouse/distribution center, or at the end retail store. In some embodiments, the tool information is provided to the locking device 300 by a user inputting the tool information via the user interface 308. In some embodiments, the tool information is provided to the locking device 300 by the remote server 120 or the cloud-based server 122, or a combination of user input via the user interface 308 and input from one or both of the servers.

Upon receiving the tool information, the locking device 300 generates a locking code (process block 506). In some embodiments, the locking device 300 generates the locking code based on the unique tool information received at process block 504. In further embodiments, the locking code may be generated using a combination of the unique tool information, as well as other parameters, such as the current date, the current time, a current geographical location, etc. As described above, the locking device 300 may apply a hashing function to the unique tool information and other parameters to generate the locking code. The generated locking code may further be stored in the remote server 120, the cloud-based server 122, or other database for verification during a subsequent unlocking process (see FIG. 6 and accompanying text).

At process block 508, the locking device 300 transmits the locking code to the tool 200. In some examples, the locking code may be transmitted to, and received by, the communication interface 204 of the tool 200. In some examples, the locking code may be stored in the memory 222 of the tool. In some embodiments, the locking device 300 transmits the locking code using an active wireless protocol, such as cellular (3G, 4G, 5G, LTE, CDMA, etc.), Bluetooth, BLE, LoRa, 6lowPAN, Wi-Fi, infrared, etc. In using active wireless protocols, power may need to be provided to the tool 200. Power may be provided to the tool 200 using an external source, or, as described above, a power supply of the tool 200 may include an internal power supply capable of powering the communication interface 204, the I/O interface 206, the user interface 208, and/or the processing circuit 202 when the external power supply is not present.

In some embodiments, the tool 200 may be configured to harvest energy from a passive wireless protocol transmitter, and utilize that energy to allow for an active wireless protocol to be used to communicate with the tool 200. For example, the energy provided from a passive wireless protocol transmitter may be harvested and converted to a current which may be stored by an energy storage device on the tool 200, such as a battery or a capacitor, which may then provide power to the communication interface and/or the processing circuit of the tool. As an example of harvesting energy, a varying current in a transmitter antenna generates a varying electromagnetic field, which induces current in a receiving coil of the tool 200 through induction. The induced current may then be stored in an energy storage device of the tool 200. In one example, the locking code may be transmitted via a tool mesh network. For example, one or more tools 200 may be in electronic communication with each other to form a mesh network. Within the mesh network one or more tools 200 may be connected to an external communication network, such as the cloud-based server 122 described above. The tools 200 connected to the external communication network may be configured to communicate messages from the external communication network to the other tools 200 in the mesh network.

In one example, the communication interface 204 of the tool 200 includes a cellular communication interface, which provides a general location of the tool 200 to the locking device 300. For example, a location of the tool 200 may be deduced from a known location of a cellular network tower or towers that receive(s) a signal from the tool 200, and the location may be provided to the locking device 300. Alternatively, or in addition, the tool 200 may include a global positioning satellite (GPS) receiver and the tool 200 may communicate its location via the cellular communication interface to the locking device 300. The locking device 300 then transmits the locking code to the tool 200 upon the locking device 300 determining that the tool 200 has arrived at a location where it is desired that the tool be locked. For example, the locking code may be transmitted to the tool when the locking device 300 determines that the tool 200 has arrived at a specific retail location. In other examples, the locking device 300 transmits the locking code to the tool 200 when it is determined that the tool 200 has arrived at a specific warehouse and/or distribution site.

In some example, the locking device 300 transmits the locking code to the tool 200 via a wired communication protocol, such as USB, serial (RS-232), Ethernet, or other wired communication protocols, including proprietary wired communication protocols. In other examples, other systems for transmitting the lock code to the tool 200 are also contemplated. For example, the lock code may be an audio signal which may be received via a microphone associated with the user interface 208 of the tool 200. In some examples, the lock code is provided via a physical mechanism provided to the I/O interface 206 of the tool 200. The physical mechanisms may include using a keyed device such as a flash drive or other keyed device. In other examples, the locking device 300 provides one or more voltage or current signals to the tool 200 via the I/O interface 206, which instructs the processing circuit 202 to lock the tool 200. In some embodiments, the tool 200 is locked via the I/O interface 206 or other interface associated with the tool 200 by physically adding or removing an object to/from the tool 200. For example, a jumper connecting two or more I/O ports on the I/O interface 206 may be added or removed, which indicates that the tool 200 is to be locked. The locking code may be provided to the tool at various points, such as at manufacturing, shipping, distribution, store receiving department, during stocking onto retail store shelves, etc.

Once the tool receives the locking code, the tool 200 is locked at process block 510. In some examples, the locking of the tool 200 results in the tool 200 being prevented from operating. For example, when the tool 200 is locked, the processing circuit 202 is configured to prevent power from being provided to the power switches 214, which in turn prevents operation of the motor 216. In one embodiment, in response to receipt of the locking code by the tool 200, a flag or bit is set in the electronic processor 220. When a user actuates the trigger or other mechanism within the user interface 208 to attempt to operate the tool 200, the processing circuit 202 detects the set flag or bit and prevents power from being provided to the power switches. In other examples, locking the tool 200 prevents the user from being able to operate the tool 200 via the user interface 208 of the tool 200. In other examples, a switch or relay may be integrated into the tool 200 and, upon receiving the locking code, the switch or relay is opened via the processing circuit 202 to prevent power from being provided to the power switches 214. The switch or relay may be positioned between the power supply 210 and the power switches 214, between the processing circuit 202 and the power switches 214, or between the power switches 214 and the motor 216. In one example, the locking code can be written to the tool 200 only once, and therefore the tool is only able to be locked once. However, in other examples, the locking code may be provided to the tool 200 multiple times, such as when the user wishes to lock the tool 200 after it has been initially unlocked.

In some embodiments, the tool 200, upon receipt of the lock code, may lock the tool in response to first verifying the authenticity of the lock code. To authenticate the lock code, the processing circuit 202 of the power tool 200 may apply an algorithm to the received lock code. As an example, the processing circuit 202 may authenticate the lock code by comparing the lock code to a previously stored lock code and determining that the compared codes match.

In some embodiments, the user interface 208 is configured to provide an indication (e.g., an audible indication, visual indication, or tactile indication) that the tool 200 has been locked.

In some embodiments, the tool 200 returns to a deep sleep state if the locking at blocks 504-510 is not completed within a particular time period, such as 30 seconds, 1 minute, or 5 minutes. For example, the stimulus may be provided to the wake-up sensor 205 in error. In some embodiments, the electronic processor 220 in the tool 200 maintains a timer and resets the wake-up sensor 205 to withdraw the wake signal if the timer elapses. Withdrawing the wake signal may reduce power consumption. In some embodiments, the wake-up sensor 205 provides a one-shot wake signal that wakes up the tool 200 for a predetermined time period. The electronic processor 220 may return to the deep sleep state responsive to the predetermined time period elapsing.

In some embodiments, the wake operation in process block 502 is omitted. The tool 200 may be in an active state after manufacture. After the tool 200 is locked in process block 510, the tool 200 enters the deep sleep state by deactivating the electronic processor 220, the communication interface 204, and the I/O interface 206.

Figure 6:
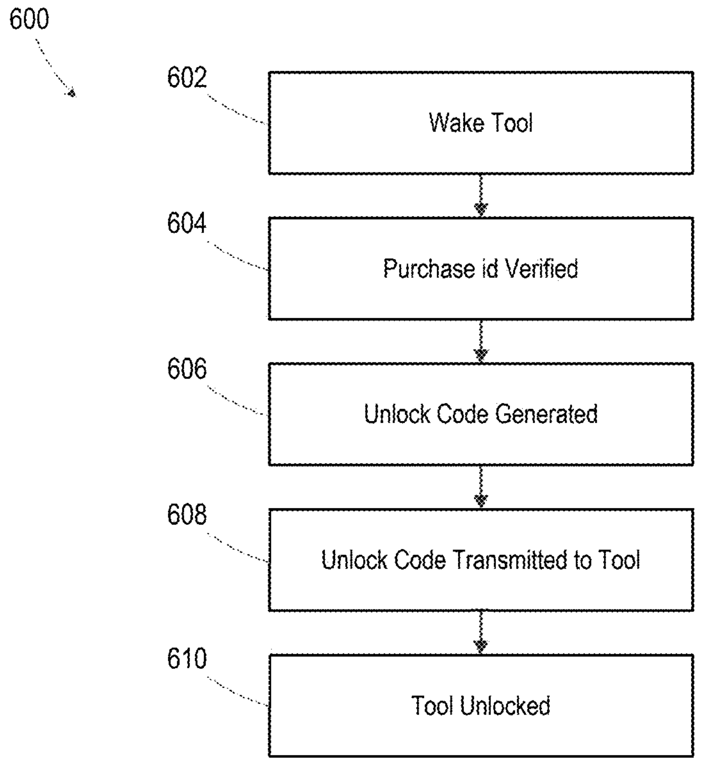
FIG. 6 is a flowchart illustrating a control method for unlocking a battery powered power tool.

Turning now to FIG. 6, a flowchart illustrating a process 600 for unlocking the power tool 200 is shown, according to some embodiments. The process 600 may be performed by, and is described with respect to, components described above (e.g., the locking device 300, the unlocking device 400, and the power tool 200); however, in some embodiments, other locking devices, unlocking devices, tools, and components are used to perform the process 600. Further, in some embodiments, the process 600 is performed after the process 500 is performed. At process block 602, the tool 200 is woken by providing the appropriate stimulus to the wake-up sensor 205. For example, the identification tag 230 may be read by the locking device 300, a magnetic swipe may be performed, a predetermined mechanical action may be performed, or another of the aforementioned stimuli may be provided. Responsive to the wake signal from the wake-up sensor 205, at least some of the elements of the tool 200, such as the electronic processor 220, the communication interface 204, and the I/O interface 206, are transitioned from a deep sleep state to an active state to allow communication with the unlocking device 400.

In one example embodiment, the locking device 300 interrogates the identification tag 230 as described above, which causes the wake-up sensor 205 to generate the wake signal. The wake signal is provided to the communication interface 204, which includes a wireless radio (for example, a BLE radio or a Bluetooth radio). The wake signal then serves as an interrupt signal to a processor of the communication interface 204, which causes the processor to exit a standby software code loop (of the deep sleep state) and to jump to main software code loop (of the woken state). Once awakened, the communication interface 204 may communicate a further wake signal to the electronic processor 220. The further wake signal may similarly serve as an interrupt that causes the electronic processor 220 to exit a standby software code loop and to jump to a main software code loop. In this example, the communication interface 204, as well as the electronic processor 220 and other elements of the processing circuit 202 may be powered by the internal power source 226 during this process block 602 (and while the external power source 212 may be disconnected from the power supply 210). In some embodiments, the wake signal is sent to both the communication interface 204 and the electronic processor 220 in parallel.

At process block 604, a purchase of the tool is verified. In some examples, the purchase is verified by one or more of the unlocking device 400, remote server 120, or cloud-based server 122 based on a communication from a point of sale, such as the point of sale 116, confirming a bona fide purchase. For example, the point of sale 116 may confirm receipt of payment based on, for example, one or more of cashier input confirming cash payment or a confirmation of payment received from a banking institution associated with the purchaser in reply to credit/debit card information provided to the institution by the point of sale 116. Then, the point of sale 116 is configured to transmit a confirmation of the bona fide purchase to one or more of the unlocking device 400, remote server 120, or cloud-based server 122, along with various purchase information relating to the purchase of the tool. Purchase information can include price paid, payment method, time, date, store identification number, geographical information, tool UPC code, tool serial number, a purchase verification message, etc. In some examples, the point of sale 116 transmits the purchase information to the remote server 120 or the cloud-based server 122. The purchase information may be further transmitted to the unlocking device 400, or other unlocking devices as described herein.

At process block 606, upon receiving the purchase information verifying the purchase, an unlock code is generated. In some embodiments, the remote server 120 or the cloud-based server 122 generates the unlock code and transmits the unlock code to the unlocking device 400. In other embodiments, the unlocking device 400 generates the unlock code. In some examples, the unlock code is generated using one or more algorithms. For example, the unlock code algorithms may generate unlock codes that are based on a similar algorithm associated with the locking code algorithm. In other examples, the unlock code algorithm may utilize the purchase information when generating the unlock code. The unlock code algorithm may generate a unique unlock code that is recognizable by a locked tool. In some embodiments, the unlock code is a generic code applicable to a class of tools (e.g., tools sold by a particular retailer, tools of a particular model type, tools of a particular manufacturing batch), which is made available to the unlocking device 400 and/or the point of sale 116 upon the purchase of the tool 200 being verified. In one example, the point of sale 116 queries the remote server 120 and/or the cloud-based server 122 to request an unlock code for the unlocking device 400 after or during the verification of the purchase of the tool 200. In some embodiments, the unlocking device 400 stores a cache of unlock keys for use should communication with the remote server 120 or the cloud-based server 122 be interrupted. The unlocking device 400 may communicate unlock keys assigned during the interruption to the remote server 120 or the cloud-based server 122 upon service restoration.

In some examples, in process block 606, the unlock code is provided to a user of the tool (e.g., the purchaser). Where the unlock code is a specific code to be input directly by the user, e.g. via a user interface of the tool, the unlock code is provided to the user at the point of sale 116. For example, the unlock code may be printed on a receipt provided to the user. In other examples, a separate document is printed with an unlock code to be provided to the user. In still further examples, the code is electronically communicated to the user, such as via a text message (SMS, MMS, etc.), a push notification message, or an e-mail. In still further examples, the unlock code is provided to an application or other program associated with the user. For example, the user may have, or be instructed to download, an application for communicating with the tool. The unlock code may then be provided to the user via the application once the user accesses the application and verifies their identity and the tool information. Other electronic messages are also contemplated.

In process block 608, the unlock code is transmitted to the tool 200. The unlock code is transmitted to the tool 200 by, for example, the unlocking device 400, the remote server 120, or the cloud-based server 122, using, for example, or more of the techniques described below. In some embodiments, the unlocking code is transmitted to the tool 200 in response to completion of the generation of the unlocking code in process block 606. In some embodiments, the unlocking code is transmitted to the tool 200 in response to verification of the purchase in process block 604 (for example, when process block 606 is completed before process block 604).

In some embodiments, the unlock code is transmitted to the tool 200 directly from the unlocking device 400. In some examples, the unlock code is transmitted to, and received by, the communication interface 204 of the tool 200. In one example, upon receipt, the unlock code is stored in a memory of the tool, such as the memory 222 or a memory of the communication interface 204 of the tool 200, and is provided to the processing circuit 202 upon the tool 200 being initialized (e.g. powered up for the first time by the user). In some embodiments, the unlock code is transmitted to the tool 200 in process block 608 using an active wireless protocol, such as cellular (3G, 4G, 5G, LTE, CDMA, etc.), Bluetooth, BLE, LoRa, 6lowPAN, Wi-Fi, infrared, etc. In using active wireless protocols, power may need to be provided to the tool 200. Power may be provided to the tool 200 using an external source, or, as described above, the power supply 210 of the tool 200 includes an internal power supply capable of powering the communication interface 204, I/O interface 206, user interface 208, and/or processing circuit 202 when the external power supply is not present. In some examples, the tool 200 may receive the unlock code upon the user providing power to the tool 200 for the first time, e.g. by attaching the battery pack to the tool 200.

In other embodiments, the unlocking code may be transmitted to the tool 200 in process block 608 via passive wireless protocols such as RFID, NFC or a simple magnetic swipe. Passive wireless protocols such as RFID and NFC can allow for the unlock signal to be received by the tool 200 without requiring the power supply 210 to be powered within the tool 200. Passive wireless protocols such as RFID and NFC can wirelessly power an associated receiver within the tool when the tool is within a physical range of the RFID and/or NFC transmitters. For example, the unlock code may be generated by the unlocking device 400 associated with the point of sale. In other examples, the unlocking device 400 may located at the exit to the store, and transmits the unlock code to the tool 200 as it passes near the unlocking device 400 when the purchaser exits the store. In some embodiments, the tool 200 is configured to harvest energy from a passive wireless protocol transmitter, and utilize that energy to allow for an active wireless protocol to be used to communicate with the tool. For example, the energy provided from a passive wireless protocol transmitter may be harvested and converted to a current which may be stored by an energy storage device on the tool, such as a battery or a capacitor, which may then provide power to the communication interface and/or the processing circuit of the tool. As an example of harvesting energy, a varying current in a transmitter antenna generates a varying electromagnetic field, which induces current in a receiving coil of the tool 200 through induction. The induced current may then be stored in an energy storage device of the tool 200. In one example, the locking code may be transmitted via a tool mesh network. For example, one or more tools 200 may be in electronic communication with each other to form a mesh network. Within the mesh network one or more tools 200 may be connected to an external communication network, such as the cloud-based server 122 described above. The tools 200 connected to the external communication network may be configured to communicate messages from the external communication network to the other tools 200 in the mesh network.

In one example, the unlock code is transmitted to the tool 200 in process block 608 via a cellular signal. For example, the unlock code may be communicated to the tool 200 from the remote server 120, the cloud-based sever 122, or the unlocking device 400 automatically when the purchase is completed. In other examples, the unlock code is transmitted to the tool 200 via the cellular signal when the tool 200 is first powered up (e.g., batteries inserted), and the tool 200 sends a cellular signal with a request for the unlock code via the communication interface 204 (e.g., to the remote server 120, the cloud-based sever 122, or the unlocking device 400).

In some examples, the unlock code may be transmitted to the tool 200 in process block 608 via a wired communication protocol, such as USB, serial (RS-232), Ethernet, or other wired communication protocols, including proprietary wired communication protocols. In other examples, other systems for transmitting the unlock code to the tool 200 are also contemplated. For example, in some examples the unlock code is an audio signal, which may be received via a microphone device associated with user interface 208 of the tool 200. In some examples, the unlock code may be provided via a physical mechanism provided to the I/O interface 206 of the tool. The physical mechanisms may include using a keyed device such as a flash drive or other keyed device. In other examples, one or more voltage or current signals may be provided to the tool 200 as the unlock code via the I/O interface 206, which can instruct the processing circuit 202 to unlock the tool 200. In some embodiments, the unlock code is transmitted to the tool 200 via the I/O interface 206 or other interface associated with the tool 200 by physically adding or removing an object to/from the tool 200. For example, a jumper connecting two or more I/O ports on the I/O interface 206 may be added or removed, which indicates that the tool 200 is to be unlocked. The unlock code may be provided to the tool at various points, such as at manufacturing, shipping, distribution, store receiving department, during stocking onto retail store shelves, etc.

Where the unlock code is provided to the user in process block 606 (e.g., on a receipt or by email), the user may transmit the unlock code directly to the tool 200 through the communication interface 204 in process block 608. In some embodiments, the user inputs the code via the user interface 208 of the tool 200. In some examples, the unlock code may be a numerical or alphanumerical code, which the user may enter via a user interface of the tool 200, such as a keypad. In other embodiments, the user may enter the numerical or alphanumerical code via an application associated with the tool, which may then transmit the unlock code to the tool 200.

In other examples, where the unlock code is provided to the user in process block 606, the user transmits the unlock code to the tool 200 in process block 608 by providing a sequence of operations or inputs to the tool 200 via the user interface 208, such as a trigger pull, to input the unlock code. The user may further transmit the unlock code by physically manipulating (e.g. shaking) the tool 200 in the provided sequence to input the unlock code. In other examples, the user is provided with one or more verbal or audio codes that can be provided to a microphone or other sensors associated with the user interface 208 of the tool 200. In some examples, the audio signals may be provided electronically to the user, as described above, allowing the user to electronically play back the audio signals to the tool via the electronic device. In some embodiments, the user establishes communication with the tool via a personal electronic device of the user. For example, the user may execute an application associated with the tool 200 on a user device, such as a computer, a smartphone, a tablet computer, etc. The application may utilize one or more communication protocols, such as Bluetooth, on the user device to communicate with the tool 200. The application then transmits the unlock code to the tool 200. In some embodiments, the unlock code is provided via the application as described above. In other examples, the user accesses an unlock code previously provided in an electronic communication (e.g. text message, e-mail, etc.), and the user device then accesses the remote server 120 and/or the cloud-based server 122, which can facilitate the user device establishing a communication with the tool 200 and transmitting the unlock code.

In some examples, the unlock code is transmitted to a separate device, such as an electronic key, which may be configured to interface with the tool 200 in order to provide the unlock code to the tool 200. For example, upon purchasing a tool, an electronic key may be provided the unlock code via the unlocking device (e.g. at the point of sale 116) and provided to the customer. Upon powering up the purchased tool 200 for the first time, the customer may interface the electronic key with the tool to transmit the unlock code to the tool 200. In some examples, the electronic key is configured to communicate wirelessly with the tool via a communication interface 204 of the tool. In other examples, the electronic key may physically interface with the tool 200, such as via the I/O interface 206.

Upon receiving the unlock code at the tool 200, the tool 200 is unlocked at process block 610. For example, the tool 200, upon receipt of the unlock code, may unlock the tool in response to verifying the authenticity of the unlock code. To authenticate the unlock code, the processing circuit 202 of the power tool 200 may apply an algorithm to a received unlock code. As an example, the processing circuit 202 may authenticate the unlock code by comparing the unlock code to a previously received lock code or a previously stored unlock code and determining that the compared codes match.

In response to verifying that the unlock code is authentic, the tool 200 is unlocked. In one example, the tool 200 is unlocked by the processing circuit 202 allowing power to be switched via the power switches 214, thereby rotating the motor of the tool 200. In other embodiments, the tool 200 is unlocked by the processing circuit 202 permitting control inputs provided by a user via the user interface 208 of the tool 200 to be processed, thereby initiating operation of the tool 200 based on the received control inputs. In one embodiment, a flag or bit is set in the electronic processor 220 upon receiving and authenticating the unlock code. When a user actuates the trigger or other mechanism within the user interface 208 to attempt to operate the tool, the processing circuit 202 detects the set flag or bit and allows power to be provided to the power switches 214. In other examples, unlocking the tool 200 allows the user to be able to operate the tool 200 via the user interface 208 of the tool 200. In other examples, a switch or relay may be integrated into the tool 200 and, upon receiving the unlocking code, the switch or relay is closed via the processing circuit 202 to allow power to be provided to the power switches 214. The switch or relay may be positioned between the power supply 210 and the power switches 214, between the processing circuit 202 and the power switches 214, or between the power switches 214 and the motor 216. In one example, the unlocking code can be written to the tool 200 only once, and therefore the tool is only able to be unlocked once. However, in other examples, the unlocking code may be provided to the tool 200 multiple times, such as when the user wishes to unlock the tool 200 after it has been locked by the user. Accordingly, after the process 600 is performed, the process 500 may again be performed.

In other specific embodiments, additionally or alternatively to the process 600, the tool 200 may be unlocked using a physical device, such as a key or other physical mechanism that can be applied by the user or retailer after a bona fide purchase when first powering on the tool 200. For example, the physical mechanism may be a key configured to interface with the communication interface 204, the I/O interface 206, and/or the user interface 208, and may contain one or more jumpers that provide an unlocking code to instruct the processing circuit 202 to unlock the tool. In some embodiments, the physical key is a coded key that can wireless communicate with the tool 200 to provide an unlock code, as described herein. In other embodiments, the tool 200 may include a physical interface that would need to be altered to unlock the tool 200. Physical interfaces may include breaking off one or more tabs on the tool 200 body, actuating one or more tool buttons or input devices in a certain sequence, or adding an electrical conductor jumper that would activate an internal unlock code based on the jumpered connections.

In some embodiments, the user interface 208 is configured to provide an indication (e.g., an audible indication, visual indication, or tactile indication) that the tool 200 has been unlocked.

In some embodiments, the wake-up sensor 205 is disabled responsive to the unlocking of the tool 200 in process block 610. Once unlocked, the tool 200 does not return to the deep sleep state. In some embodiments, the tool 200 returns to a deep sleep state if the unlocking at blocks 604-610 is not completed within a particular time period, such as 30 seconds, 1 minute, or 5 minutes. For example, the stimulus may be provided to the wake-up sensor 205 in error or the purchaser may fail to complete the purchase. In some embodiments, the electronic processor 220 in the tool 200 maintains a timer and resets the wake-up sensor 205 to withdraw the wake signal if the timer elapses. Withdrawing the wake signal may reduce power consumption. In some embodiments, the wake-up sensor 205 provides a one shot wake signal that wakes up the tool 200 for a predetermined time period. The electronic processor 220 may return to the deep sleep state responsive to the predetermined time period elapsing.

In some embodiments, the wake-up sensor 205 or electronic processor 220 monitors the charge level of the internal power source 226 (e.g., via a voltage sensor) and, when the charge level drops below a predetermined threshold (e.g., when the voltage level drops below a predetermined threshold), the wake-up sensor 205 generates the wake signal and indicates a low battery, and the electronic processor 220 unlocks the tool. Accordingly, before the internal power source 226 may be depleted and, thus, unlocking the tool 200 may involve additional steps (e.g., replacing the internal power source 226), the tool 200 is unlocked.

Turning now to FIG. 7, a block diagram of a rechargeable external battery pack 700 is shown, according to some embodiments. The battery pack 700 may be similar to and used as the external power source 212, described above, and is an example of a power tool device 110 implemented as a power tool battery pack. As shown in FIG. 7, the battery pack 700 includes a number of battery cells 702, a battery management system (BMS) 704, a switching device 706, a number of output terminals 708, a communication interface 710, and a wake-up sensor 711. In some embodiments, the wake-up sensor 711 includes an identification tag 713.

In one embodiment, the battery cells 702 are Li-Ion battery cells. However, in other examples, the battery cells may be nickel cadmium (NiCd) battery cells, Nickel-Metal Hydride (NiMH) battery cells, lead acid battery cells, lithium polymer batteries, and/or other battery types, as applicable. Further, the Li-Ion battery cells may be lithium cobalt oxide cells, lithium manganese oxide cells, lithium iron phosphate cells, lithium nickel manganese cobalt oxide cells, lithium nickel cobalt aluminum oxide cells, and/or lithium titanate cells. Further, the Li-Ion battery cells may be small cylindrical cells, large cylindrical cells, pouch cells, and/or prismatic cells. The battery cells 702 may be arranged in multiple configurations to provide the voltage, current and power levels required of the battery pack 700. In one embodiment, the battery cells 702 include one or more terminals, such as negative terminal 712 and positive terminal 714 to provide one or more connections to allow for the stored energy of the battery cells 702 to be coupled to other devices or systems. In some embodiments, the battery cells 702 may have more than two terminals to allow for multiple voltage taps (e.g. to provide multiple voltage and/or power levels from the battery cells 702), communication with an attached device to be powered, or both.

In one embodiment, one or more of the battery cell terminals 712, 714 are coupled to the output terminals 708 of the battery pack 700. The output terminals 708 can be used to transfer power from the battery pack 700 to a device coupled to the battery pack, such as the tools 200 described above. In other embodiments, the battery pack 700 includes multiple battery cell terminals for providing multiple connections to the battery cells 702 and one or more other components of the battery pack 700, such as the output terminals 708, the battery management system 704, and the communication interface 710. The battery cells 702 may include battery cell terminals for multiple voltage connections (e.g. voltage taps) and/or data connections to the battery cells 702. In one embodiment, the switching device 706 can be utilized to allow for one or more of the battery cell terminals 712, 714 to be disconnected from the output terminals 708, thereby removing power from the output terminals 708. While FIG. 7 illustrates that the switching device 706 is configured to electrically disconnect the (+) terminal 714, in some embodiments, the switching device 706 is configured to electrically disconnect the (−) terminal 712. In further examples, the switching device 706 may be configured to electrically disconnect any one of the battery cell terminals described above from their respective connections to the battery pack to prevent the operation of the battery pack 700. In still other examples, one or more switching devices 706 may be configured to electrically disconnect some or all of the battery cell terminals from their respective connections to the battery pack 700 (e.g. output terminals 708, the battery management system 704, the communication interface 710, etc.) to prevent operation of the battery pack 700. In one example, the switching device 706 may be configured to disconnect other connections to the output terminals to prevent operation of the battery pack 700. For example, the switching device 706 may be configured to disconnect data connections between the battery management system 704 and the battery cells 702 and/or output terminals, thereby preventing operation of the battery pack 700 (e.g., preventing power from being output by the battery pack 700 and/or communication with the battery pack 700). The switching device 706 may be Field Effect Transistor (FET). However, other power switch types are contemplated, such as BJT transistors, CMOS transistors, insulated gate bipolar transistors (IGBT), etc. Further, the switching device 706 may be a mechanical switch, such as a reed switch, a mechanical relay, etc. The switching device 706 can allow the battery pack 700 to be "locked," meaning that power will not be provided to the output terminals 708 until the switching device 706 is controlled to close, thereby providing power from the terminals 712, 714 to the output terminals 708.

In one embodiment, the battery management system 704 may control the switching device 706 to switch conditions. In further embodiments, the battery management system 704 receives instructions to control the switching device 706 from the communication interface 710. The communication interface 710 is configured to facilitate communications between the battery management system 704 and one or more external devices and/or networks. The communication interface 710 can be or include wired or wireless communications interfaces (e.g., jacks, antennas, transmitters, receivers, transceivers, wire terminals, etc.) for conducting data communications between the battery pack 700 and one or more external devices, such as the locking devices and unlocking devices described herein. In some embodiments, the communication interface 710 is a wireless communication interface such as cellular (3G, 4G, LTE, CDMA, 5G, etc.), Wi-Fi, Wi-MAX, ZigBee, ZigBee Pro, Bluetooth, Bluetooth Low Energy (BLE), RF, LoRa, LoRaWAN, Near Field Communication (NFC), Radio Frequency Identification (RFID), Z-Wave, 6LoWPAN, Thread, WiFi-ah, and/or other wireless communication protocols. Additionally, the communication interface 710 may include wired interfaces such as Universal Serial Bus (USB), USB-C, Firewire, Lightning, CAT5, universal asynchronous receiver/transmitter (UART), serial (RS-232, RS-485), etc.

As stated above, the communication interface 710 provides a signal to the battery management system 704 indicating a desired condition of the switching device 706. In other embodiments, the communication interface 710 is in direct communication with the switching device 706 and can control the condition of the switching device without requiring the battery management system 704. In multiple embodiments, the battery pack 700 described above can be "locked" and "unlocked" using the switching device 706, via any of the methods or using any of the systems described herein. For example, wake-up sensor 711 may be activated to generate a wake signal to wake the battery management system 704 and the communication interface 710, using techniques as described above with respect to the power tool 200. Once awakened, the battery pack 700 may be configured to be locked and unlocked by any of the respective locking and unlocking devices described herein. As a particular example, the battery pack 700 may take the place of the tool 200 in the processes 500 and 600 of FIGS. 5 and 6, respectively, carrying out the actions of the tool 200 and being controlled as the tool 200 is controlled within these methods.

Figure 8:
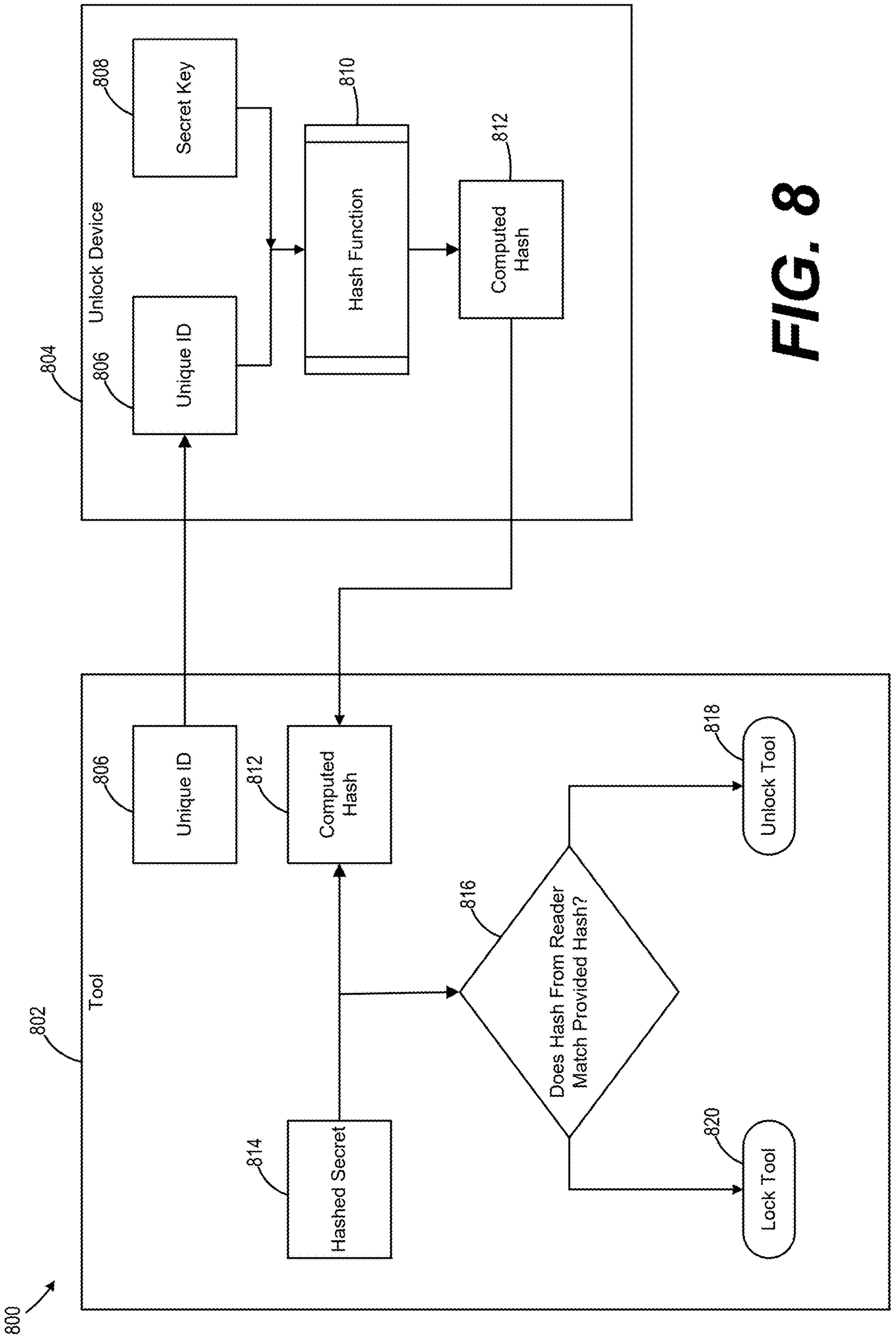
FIG. 8 is a process diagram illustrating a process for generating an unlock code using a hashing function.

Turning now to FIG. 8, a process diagram is illustrated showing a hashing process 800 for providing an unlocking code to a tool, according to some embodiments. The process 800 shows both a battery-powered power tool 802 and an unlocking device 804. The battery-powered power tool 802 and the unlocking device 804 may be similar to and used as the power tools (e.g., the power tool 200) and unlocking devices (e.g., the unlocking device 400) described above. Accordingly, communications between the tool 802 and the unlocking device 804 may be effectuated using the systems and methods described above. The tool 802 may provide a unique ID 806 to the unlocking device 804. The unique ID 806 may be a unique ID associated with the tool 802. The unique ID 806 is then combined with a secret key 808 stored in the unlocking device 804. The secret key 808 may be embedded or stored in the unlocking device 804. In other embodiments, the unlocking device 804 may receive the secret key for each transaction from one or more sources, such as the remote server 120, the cloud-based server 122, or the point of sale 116. The unique ID 806 and the secret key 808 are combined in the hash function 810. The hash function 810 then outputs a computed hash 812 based on the unique ID 806 and the secret key 808, and then transmits the computed hash 812 to the tool 802. The tool 802 then compares the computed hash 812 to a hashed secret 814 stored in the tool 802. The hashed secret 814 may be written to the tool 802 during manufacturing, or, alternatively, during a locking process, such as the locking processes described above (see, e.g., the process 500 of FIG. 5). The tool 802 then compares the hashed secret 814 with the computed hash 812 at process block 816. If the computed hash 812 matches the hashed secret 814, the tool is unlocked at process block 818. If the computed hash 812 does not match the hashed secret 814, the tool remains locked at process block 820.

In some embodiments, the block diagram of the power tool 200 in FIG. 2 applies to the tool 802 and the block diagram of the unlocking device 400 of FIG. 4 applies to the unlocking device 804. For example, the various functions attributed to the unlocking device 804 (e.g., receiving unique IDs, hashing, sending computing hash) may be implemented with a processing circuit similar to the processing circuit 402 of FIG. 4. Similarly, the various functions attributed to the tool 802 (e.g., sending a unique ID, comparing hashes, locking/unlocking tool) may be implemented with a processing circuit similar to the processing circuit 202 of FIG. 2.

Figure 9:
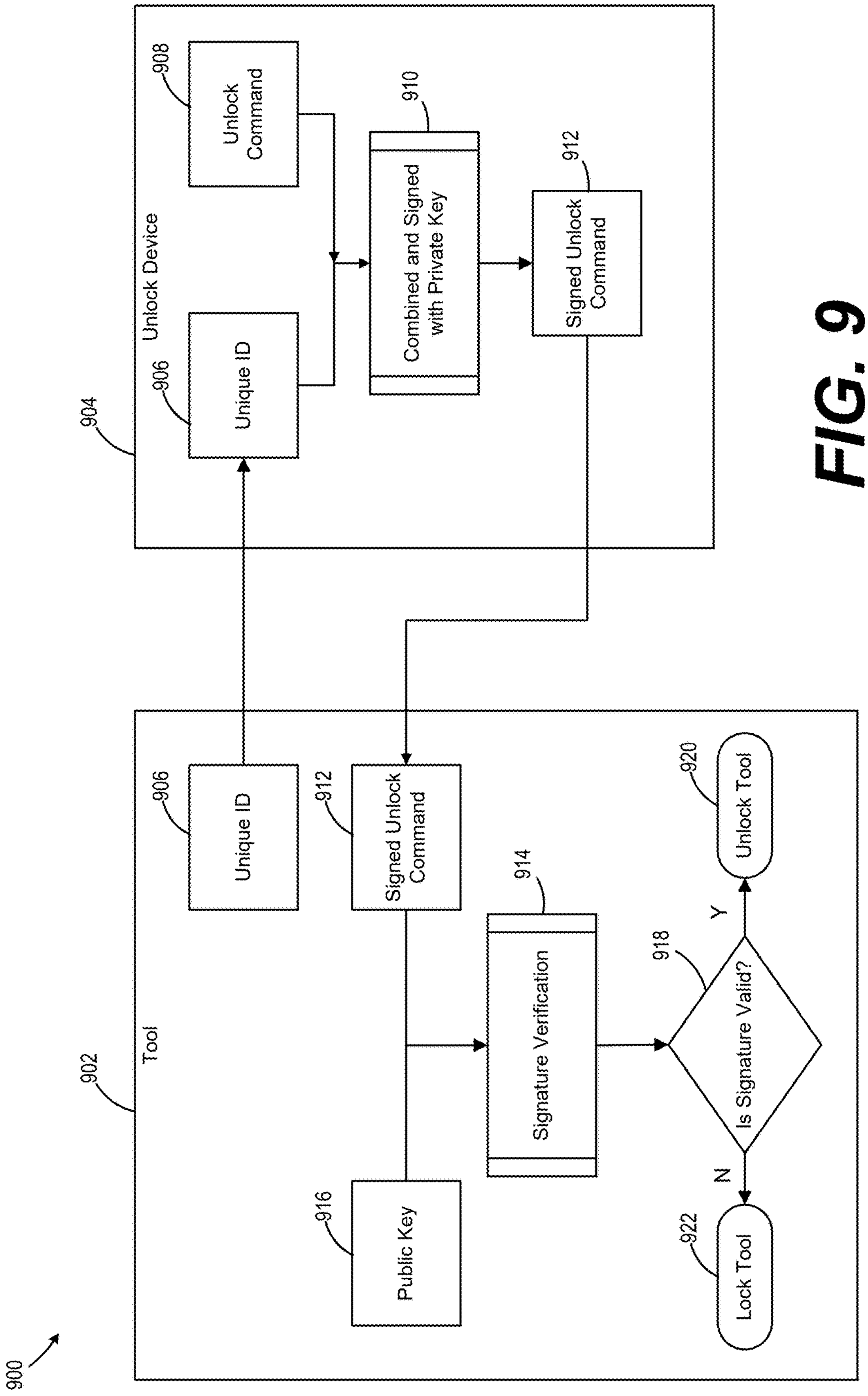
FIG. 9 is a process diagram illustrating a process for generating an unlock code using a digital signature function.

Turning now to FIG. 9, a process diagram is illustrated showing a digital signature process 900 for providing an unlocking code to a tool, according to some embodiments. The process 900 includes both a battery-powered power tool 902 and an unlocking device 904. The tool 902 and the unlocking device 904 may be similar to and used as the power tools (e.g., the power tool 200) and unlocking devices (e.g., the unlocking device 400) described above. Accordingly, communications between the tool 902 and the unlocking device 904 may be effectuated using the systems and methods described above. The tool 902 may provide a unique ID 906 to the unlocking device 904. The unique ID 906 may be a unique ID associated with the tool 902. The unlocking device 904 is further configured to generate an unlock command 908. In some embodiments, the unlock command 908 is generated by the unlocking device 904 upon the unlocking device receiving the unique ID 906. The unlocking device 904 then executes a digital signature function 910 to generate a signed unlock command 912 based on the unique ID 906 and the unlock command 908. The signed unlock command 912 is then transmitted to the tool 902. The tool 902 reads the signed unlock command 912, and validates the signed unlock command 912 using the signature verification function 914. The signature verification function 914 uses a public key 916 stored in the tool 902 to verify the signed unlock command 912. The public key 916 may be stored on the tool 902 during manufacturing. In other embodiments, the public key is provided to the tool 902 during a locking process, such as those described above (see, e.g., the process 500 of FIG. 5). If the signature verification function 914 verifies that the signature is valid at decision block 918, the tool is unlocked at process block 920. If the signature verification function 914 determines that the signature is not valid at decision block 918, the tool remains locked at process block 922.

In some embodiments, the block diagram of the power tool 200 in FIG. 2 applies to the tool 902 and the block diagram of the unlocking device 400 of FIG. 4 applies to the unlocking device 904. For example, the various functions attributed to the unlocking device 904 (e.g., receiving unique IDs, combining unique IDs with commands and signing with private keys, and transmitting signed unlock commands) may be implemented with a processing circuit similar to the processing circuit 402 of FIG. 4. Similarly, the various functions attributed to the tool 902 (e.g., sending a unique ID, signature verification, unlocking/locking tool) may be implemented with a processing circuit similar to the processing circuit 202 of FIG. 2.

Figure 10:
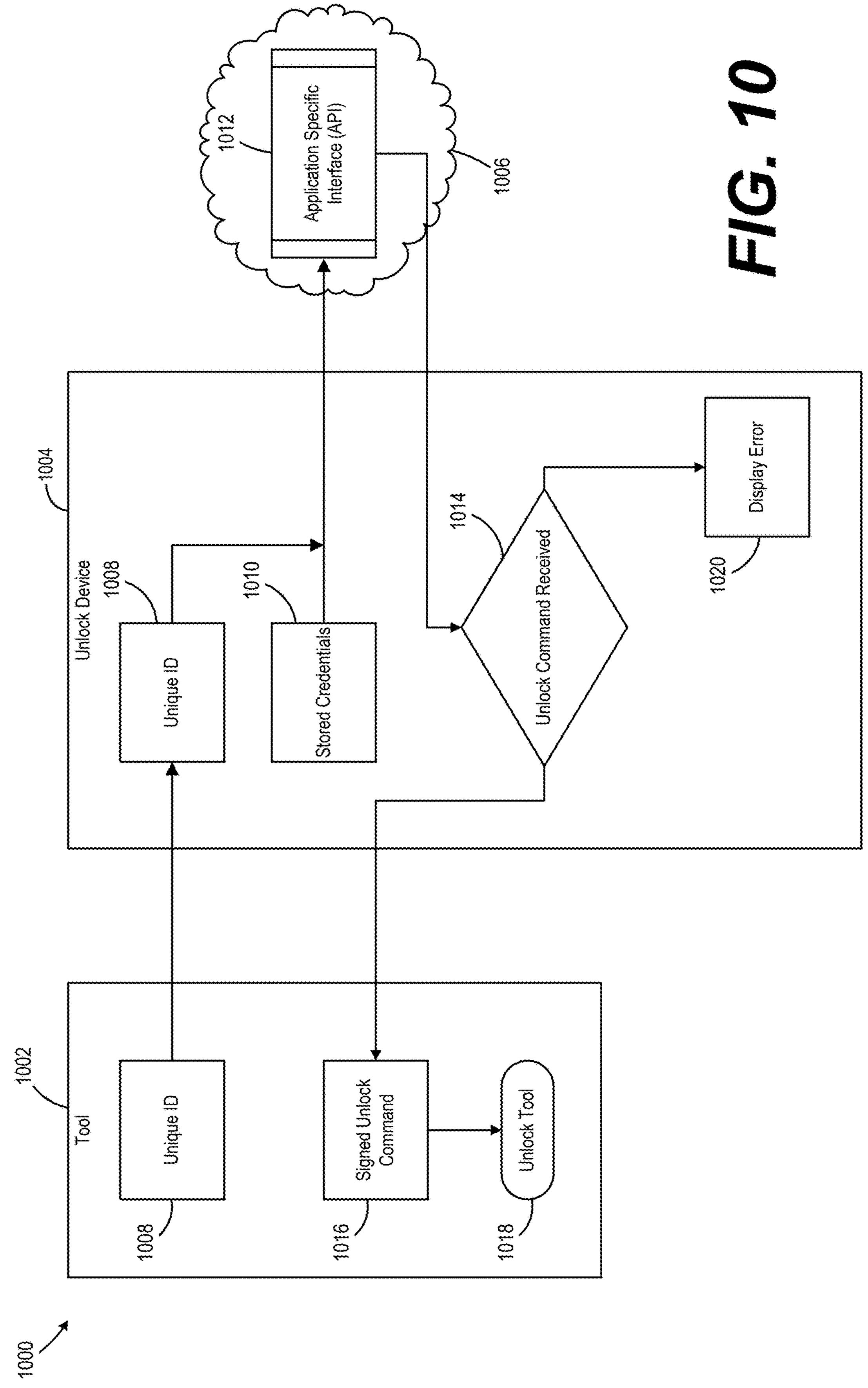
FIG. 10 is a process diagram illustrating a process for generating an unlock code using an external application programming interface (API) authorization function.

Turning now to FIG. 10, a process diagram illustrating an external application programming interface (API) authentication process 1000 for providing an unlocking code to a tool is shown, according to some embodiments. The process 1000 includes a battery-powered power tool 1002, an unlocking device 1004 and a cloud-based server 1006. The tool 1002, the unlocking device 1004, and the server 1006 may be similar to and used as the power tools (e.g., the power tool 200), unlocking devices (e.g., the unlocking device 400), and servers (e.g., the remote server 120 and the cloud-based server 122) described above. Accordingly, communications between the tool 1002, the unlocking device 1004, and/or the server 1006 may be effectuated using the systems and methods described above. During the unlock process, the tool 1002 may provide a unique ID 1008 to the unlocking device 1004. The unique ID 1008 may be a unique ID associated with the tool 1002. The unlocking device 1004 then transmits the unique ID 1008 along with one or more stored or embedded credentials 1010 to an application programming interface (API) 1012 stored in the server 1006.

The stored credentials 1010 may be provided to the unlocking device 1004 when the unlocking device 1004 is first initialized.

The API 1012, upon receiving the unique ID 1008 and the stored credential 1010, determines whether the stored credentials 1010 are valid, and whether the tool should be unlocked based on the unique ID (for example, by accessing a database that associates unique IDs and valid stored credentials). When the API 1012 determines that the tool 1002 should be unlocked, an unlock command is sent to the unlocking device 1004 from the API 1012. In some embodiments, the unlock command may be an HTTP response command. When the unlock command is determined to have been received at process block 1014, a signed unlock command 1016 is transmitted to the tool 1002 from the unlocking device 1004 and the tool is unlocked at process block 1018. When the unlock command is not received, or when a non-valid request message is received by the unlocking device 1004, an error is displayed on the unlocking device 1004 at process block 1020.

In some embodiments, the block diagram of the power tool 200 in FIG. 2 applies to the tool 1002 and the block diagram of the unlocking device 400 of FIG. 4 applies to the unlocking device 1004. For example, the various functions attributed to the unlocking device 1004 (e.g., receiving a unit ID, sending credentials, determining whether an unlock command is received, transmitting a signed unlock command to the tool) may be implemented with a processing circuit similar to the processing circuit 402 of FIG. 4. Similarly, the various functions attributed to the tool 1002 (e.g., sending a unique ID, receiving a signed unlock command and unlocking,) may be implemented with a processing circuit similar to the processing circuit 202 of FIG. 2.

We claim:

1. A method for controlling activation of an electronic power tool device, the method comprising:

generating, by a wake-up sensor of the electronic power tool device, a wake signal in response to a predetermined stimulus received at the wake-up sensor;

outputting, by the wake-up sensor, the wake signal to an electronic processor of the electronic power tool device, the wake signal changing a power consumption state of the electronic processor; and receiving, by the electronic processor after receiving the wake signal, an activation state code, wherein the activation state code is configured to control an activation state of the electronic power tool device upon being received at the electronic power tool device, and the activation state includes an unlock state or a lock state.

2. The method of claim 1, wherein receiving the activation state code by the electronic processor includes receiving the activation state code, by the electronic processor, from a communication interface of the electronic power tool device.

3. The method of claim 2, further comprising receiving the activation state code by the communication interface wirelessly.

4. The method of claim 2, wherein outputting the wake signal to the electronic processor includes:

providing the wake signal to the communication interface, the wake signal causing the communication interface to exit a standby state and enter a woken state, and providing, by the communication interface in the woken state, a further wake signal to the electronic processor, the further wake signal causing the electronic processor to exit the standby state and enter the woken state.

5. The method of claim 2, further comprising outputting, by the wake-up sensor, a further wake signal to the communication interface of the electronic power tool device in response to the predetermined stimulus received at the wake-up sensor.

6. The method of claim 1, further comprising maintaining, by the electronic processor, a timer and resetting the wake-up sensor to withdraw the wake signal in response to the timer elapsing.

7. The method of claim 1, wherein the predetermined stimulus includes a read or write transaction performed on an identification tag of the wake-up sensor.

8. The method of claim 1, wherein the predetermined stimulus includes an induced current.

9. The method of claim 1, wherein the predetermined stimulus includes a motion signal.

10. The method of claim 1, wherein the predetermined stimulus includes an audio signal pattern.

11. An electronic power tool device, comprising:

an electronic processor;

a communication interface in communication with the electronic processor;

an internal power source; and a wake-up sensor configured to:

generate a wake signal in response to a predetermined stimulus received at the wake-up sensor, and output the wake signal to an electronic processor of the electronic power tool device, the wake signal changing a power consumption state of the electronic processor with respect to the internal power source, wherein the electronic processor is configured to receive, after receiving the wake signal, an activation state code, wherein the activation state code is configured to control an activation state of the electronic power tool device upon being received at the electronic power tool device, and the activation state includes an unlock state or a lock state.

12. The electronic power tool device of claim 11, wherein the communication interface is configured to receive the activation state code and communicate the activation state code to the electronic processor.

13. The electronic power tool device of claim 12, wherein the communication interface is configured to receive the activation state code wirelessly.

14. The electronic power tool device of claim 12, wherein the wake-up sensor is configured to output the wake signal to the electronic processor by:

providing the wake signal to the communication interface, the wake signal causing the communication interface to exit a standby state and enter a woken state, and providing, by the communication interface in the woken state, a further wake signal to the electronic processor, the further wake signal causing the electronic processor to exit the standby state and enter the woken state.

15. The electronic power tool device of claim 12, wherein the wake-up sensor is further configured to output a further wake signal to the communication interface in response to the predetermined stimulus received at the wake-up sensor.

16. The electronic power tool device of claim 11, wherein the electronic processor is further configured to maintain a timer and reset the wake-up sensor to withdraw the wake signal in response to the timer elapsing.

17. The electronic power tool device of claim 11, wherein the predetermined stimulus includes a read or write transaction performed on an identification tag of the wake-up sensor.

18. The electronic power tool device of claim 11, wherein the predetermined stimulus includes an induced current.

19. The electronic power tool device of claim 11, wherein the predetermined stimulus includes a motion signal.

20. The electronic power tool device of claim 11, wherein the predetermined stimulus includes an audio signal pattern.

* * * * *